(12) United States Patent
Medvedev et al.

(10) Patent No.: US 8,194,770 B2
(45) Date of Patent: *Jun. 5, 2012

(54) CODED MIMO SYSTEMS WITH SELECTIVE CHANNEL INVERSION APPLIED PER EIGENMODE

(75) Inventors: Irina Medvedev, Somerville, MA (US); Jay Rod Walton, Carlisle, MA (US); John W. Ketchum, Harvard, MA (US)

(73) Assignee: Qualcomm Incorporated, San Diego, CA (US)

( * ) Notice: Subject to any disclaimer, the term of this patent is extended or adjusted under 35 U.S.C. 154(b) by 1112 days.

This patent is subject to a terminal disclaimer.

(21) Appl. No.: 10/229,209

(22) Filed: Aug. 27, 2002

(65) Prior Publication Data
US 2004/0042556 A1    Mar. 4, 2004

(51) Int. Cl.
*H04B 7/02* (2006.01)
*H04L 1/02* (2006.01)
(52) U.S. Cl. ........................ 375/267; 375/299
(58) Field of Classification Search .......... 375/260, 375/267, 295, 299
See application file for complete search history.

(56) References Cited

U.S. PATENT DOCUMENTS

| | | | |
|---|---|---|---|
| 4,736,371 A | 4/1988 | Tejima et al. | |
| 4,750,198 A | 6/1988 | Harper | |
| 4,797,879 A | 1/1989 | Habbab et al. | |
| 5,241,544 A | 8/1993 | Jasper et al. | |
| 5,295,159 A * | 3/1994 | Kerpez | 375/260 |
| 5,404,355 A | 4/1995 | Raith | |
| 5,471,647 A | 11/1995 | Gerlach et al. | |
| 5,479,447 A | 12/1995 | Chow et al. | |
| 5,493,712 A | 2/1996 | Ramesh et al. | |
| 5,506,861 A | 4/1996 | Bottomley | |
| 5,509,003 A | 4/1996 | Snijders et al. | |
| 5,606,729 A | 2/1997 | D'Amico | |
| 5,638,369 A | 6/1997 | Ayerst et al. | |

(Continued)

FOREIGN PATENT DOCUMENTS

AU    2002259221    11/2002

(Continued)

OTHER PUBLICATIONS

Choeng et al, Mutiuser OFDM with Adaptive Subcarrier, Bit and Power Allocation, Oct. 1999, IEEE Journal on Selected Areas in Communications, vol. 17, No. 10, pp. 1747-1758.*

(Continued)

*Primary Examiner* — Chieh M. Fan
*Assistant Examiner* — Freshteh N Aghdam
(74) *Attorney, Agent, or Firm* — Qualcomm Patent Group; James H. Yancey, Jr.

(57) ABSTRACT

Techniques to perform selective channel inversion per eigenmode in a MIMO system to achieve high spectral efficiency while reducing complexity at both the transmitter and receiver are presented. The available transmission channels are arranged into a number of groups, where each group may include all transmission channels (or frequency bins) for a respective eigenmode of a MIMO channel. The total transmit power is allocated to the groups using a particular group power allocation scheme. Selective channel inversion is then performed independently for each group selected for use for data transmission. For each such group, one or more transmission channels in the group are selected for use, and a scaling factor is determined for each selected channel such that all selected channels for the group achieve similar received signal quality (e.g., received SNR).

39 Claims, 5 Drawing Sheets

U.S. PATENT DOCUMENTS

| Patent No. | Kind | Date | Inventor(s) | Ref |
|---|---|---|---|---|
| 5,677,909 | A | 10/1997 | Heide | |
| 5,729,542 | A | 3/1998 | Dupont | |
| 5,790,550 | A | 8/1998 | Peeters et al. | |
| 5,818,813 | A | 10/1998 | Saito et al. | |
| 5,822,374 | A | 10/1998 | Levin | |
| 5,832,387 | A | 11/1998 | Bae et al. | |
| 5,867,478 | A | 2/1999 | Baum et al. | |
| 5,867,539 | A | 2/1999 | Koslov | |
| 5,886,988 | A | 3/1999 | Yun et al. | |
| 5,959,965 | A | 9/1999 | Ohkubo et al. | |
| 5,973,638 | A | 10/1999 | Robbins et al. | |
| 5,982,327 | A | 11/1999 | Vook et al. | |
| 6,049,548 | A | 4/2000 | Bruno et al. | |
| 6,072,779 | A | 6/2000 | Tzannes et al. | |
| 6,084,915 | A | 7/2000 | Williams | |
| 6,097,771 | A | 8/2000 | Foschini | |
| 6,115,354 | A | 9/2000 | Weck | |
| 6,122,247 | A | 9/2000 | Levin et al. | |
| 6,131,016 | A | 10/2000 | Greenstein et al. | |
| 6,141,388 | A | 10/2000 | Servais et al. | |
| 6,141,542 | A | 10/2000 | Kotzin et al. | |
| 6,141,567 | A | 10/2000 | Youssefmir et al. | |
| 6,144,711 | A | 11/2000 | Raleigh et al. | |
| 6,163,296 | A | 12/2000 | Lier et al. | |
| 6,167,031 | A * | 12/2000 | Olofsson et al. | 370/252 |
| 6,178,196 | B1 | 1/2001 | Naguib et al. | |
| 6,205,410 | B1 | 3/2001 | Cai | |
| 6,222,888 | B1 | 4/2001 | Kao et al. | |
| 6,232,918 | B1 | 5/2001 | Wax et al. | |
| 6,266,528 | B1 | 7/2001 | Farzaneh | |
| 6,275,543 | B1 | 8/2001 | Petrus et al. | |
| 6,278,726 | B1 | 8/2001 | Mesecher et al. | |
| 6,292,917 | B1 | 9/2001 | Sinha et al. | |
| 6,298,035 | B1 | 10/2001 | Heiskala | |
| 6,298,092 | B1 | 10/2001 | Heath, Jr. et al. | |
| 6,308,080 | B1 | 10/2001 | Burt et al. | |
| 6,314,113 | B1 | 11/2001 | Guemas | |
| 6,314,289 | B1 | 11/2001 | Eberlein et al. | |
| 6,317,612 | B1 | 11/2001 | Farsakh | |
| 6,330,277 | B1 | 12/2001 | Gelblum et al. | |
| 6,330,293 | B1 | 12/2001 | Klank et al. | |
| 6,330,462 | B1 | 12/2001 | Chen | |
| 6,333,953 | B1 | 12/2001 | Bottomley et al. | |
| 6,339,399 | B1 | 1/2002 | Andersson et al. | |
| 6,345,036 | B1 | 2/2002 | Sudo et al. | |
| 6,346,910 | B1 | 2/2002 | Ito | |
| 6,351,499 | B1 | 2/2002 | Paulraj et al. | |
| 6,363,267 | B1 | 3/2002 | Lindskog et al. | |
| 6,377,812 | B1 | 4/2002 | Rashid-Farrokhi et al. | |
| 6,385,264 | B1 | 5/2002 | Terasawa et al. | |
| 6,426,971 | B1 | 7/2002 | Wu et al. | |
| 6,452,981 | B1 * | 9/2002 | Raleigh et al. | 375/299 |
| 6,463,290 | B1 | 10/2002 | Stilp et al. | |
| 6,473,467 | B1 | 10/2002 | Wallace et al. | |
| 6,478,422 | B1 | 11/2002 | Hansen | |
| 6,492,942 | B1 | 12/2002 | Kezys | |
| 6,510,184 | B1 | 1/2003 | Okamura | |
| 6,515,617 | B1 | 2/2003 | Demers et al. | |
| 6,532,225 | B1 | 3/2003 | Chang et al. | |
| 6,532,255 | B1 | 3/2003 | Gunzelmann et al. | |
| 6,532,562 | B1 | 3/2003 | Chou et al. | |
| 6,545,997 | B1 | 4/2003 | Bohnke et al. | |
| 6,574,211 | B2 | 6/2003 | Padovani et al. | |
| 6,574,267 | B1 | 6/2003 | Kanterakis et al. | |
| 6,574,271 | B2 | 6/2003 | Mesecher et al. | |
| 6,594,473 | B1 | 7/2003 | Dabak et al. | |
| 6,594,798 | B1 | 7/2003 | Chou et al. | |
| 6,597,682 | B1 | 7/2003 | Kari | |
| 6,608,874 | B1 | 8/2003 | Beidas et al. | |
| 6,611,231 | B2 | 8/2003 | Crilly, Jr. et al. | |
| 6,631,121 | B1 | 10/2003 | Yoon | |
| 6,636,496 | B1 | 10/2003 | Cho et al. | |
| 6,636,568 | B2 | 10/2003 | Kadous | |
| 6,654,590 | B2 | 11/2003 | Boros et al. | |
| 6,654,613 | B1 | 11/2003 | Maeng et al. | |
| 6,668,161 | B2 | 12/2003 | Boros et al. | |
| 6,683,916 | B1 * | 1/2004 | Sartori et al. | 375/295 |
| 6,690,660 | B2 | 2/2004 | Kim et al. | |
| 6,693,992 | B2 | 2/2004 | Jones et al. | |
| 6,697,346 | B1 | 2/2004 | Halton et al. | |
| 6,728,233 | B1 | 4/2004 | Park et al. | |
| 6,731,668 | B2 | 5/2004 | Ketchum | |
| 6,735,188 | B1 | 5/2004 | Becker et al. | |
| 6,738,020 | B1 | 5/2004 | Lindskog et al. | |
| 6,744,811 | B1 | 6/2004 | Kantschuk | |
| 6,751,187 | B2 * | 6/2004 | Walton et al. | 370/210 |
| 6,751,444 | B1 * | 6/2004 | Meiyappan | 455/69 |
| 6,751,480 | B2 | 6/2004 | Kogiantis et al. | |
| 6,757,263 | B1 | 6/2004 | Olds | |
| 6,760,313 | B1 | 7/2004 | Sindhushayana et al. | |
| 6,760,388 | B2 | 7/2004 | Ketchum et al. | |
| 6,760,882 | B1 | 7/2004 | Gesbert et al. | |
| 6,768,727 | B1 | 7/2004 | Sourour et al. | |
| 6,771,706 | B2 | 8/2004 | Ling et al. | |
| 6,785,341 | B2 | 8/2004 | Walton et al. | |
| 6,785,513 | B1 | 8/2004 | Sivaprakasam | |
| 6,788,948 | B2 | 9/2004 | Lindskog et al. | |
| 6,792,041 | B1 | 9/2004 | Kim et al. | |
| 6,795,424 | B1 | 9/2004 | Kapoor et al. | |
| 6,798,738 | B1 | 9/2004 | Do et al. | |
| 6,801,790 | B2 | 10/2004 | Rudrapatna | |
| 6,802,035 | B2 | 10/2004 | Catreux et al. | |
| 6,804,191 | B2 | 10/2004 | Richardson | |
| 6,821,535 | B2 | 11/2004 | Nurmi et al. | |
| 6,847,828 | B2 | 1/2005 | Miyoshi et al. | |
| 6,850,252 | B1 | 2/2005 | Hoffberg | |
| 6,850,498 | B2 | 2/2005 | Heath et al. | |
| 6,859,503 | B2 * | 2/2005 | Pautler et al. | 375/299 |
| 6,862,271 | B2 | 3/2005 | Medvedev et al. | |
| 6,862,440 | B2 | 3/2005 | Sampath | |
| 6,868,079 | B1 | 3/2005 | Hunt | |
| 6,873,651 | B2 | 3/2005 | Tesfai et al. | |
| 6,879,578 | B2 | 4/2005 | Pan et al. | |
| 6,879,579 | B1 | 4/2005 | Myles et al. | |
| 6,885,708 | B2 | 4/2005 | Thomas et al. | |
| 6,888,809 | B1 | 5/2005 | Foschini et al. | |
| 6,888,899 | B2 | 5/2005 | Raleigh et al. | |
| 6,891,858 | B1 | 5/2005 | Mahesh et al. | |
| 6,920,192 | B1 | 7/2005 | Laroia et al. | |
| 6,920,194 | B2 | 7/2005 | Stopler et al. | |
| 6,927,728 | B2 | 8/2005 | Vook et al. | |
| 6,937,592 | B1 | 8/2005 | Heath, Jr. et al. | |
| 6,940,917 | B2 | 9/2005 | Menon et al. | |
| 6,950,632 | B1 | 9/2005 | Yun et al. | |
| 6,952,426 | B2 | 10/2005 | Wu et al. | |
| 6,952,454 | B1 | 10/2005 | Jalali et al. | |
| 6,956,813 | B2 | 10/2005 | Fukuda | |
| 6,956,906 | B2 | 10/2005 | Tager et al. | |
| 6,959,171 | B2 | 10/2005 | Tsien et al. | |
| 6,963,742 | B2 | 11/2005 | Boros et al. | |
| 6,965,762 | B2 * | 11/2005 | Sugar et al. | 455/276.1 |
| 6,980,601 | B2 | 12/2005 | Jones | |
| 6,980,800 | B2 | 12/2005 | Noerpel et al. | |
| 6,985,434 | B2 | 1/2006 | Wu et al. | |
| 6,985,534 | B1 | 1/2006 | Meister | |
| 6,987,819 | B2 | 1/2006 | Thomas et al. | |
| 6,990,059 | B1 | 1/2006 | Anikhindi et al. | |
| 6,992,972 | B2 | 1/2006 | Van Nee | |
| 6,996,380 | B2 | 2/2006 | Dent | |
| 7,006,464 | B1 | 2/2006 | Gopalakrishnan et al. | |
| 7,006,483 | B2 | 2/2006 | Nelson, Jr. et al. | |
| 7,006,848 | B2 | 2/2006 | Ling et al. | |
| 7,009,931 | B2 | 3/2006 | Ma et al. | |
| 7,012,978 | B2 | 3/2006 | Talwar | |
| 7,020,110 | B2 | 3/2006 | Walton et al. | |
| 7,020,482 | B2 | 3/2006 | Medvedev et al. | |
| 7,020,490 | B2 | 3/2006 | Khatri | |
| 7,023,826 | B2 | 4/2006 | Sjoberg et al. | |
| 7,031,671 | B2 | 4/2006 | Mottier | |
| 7,035,359 | B2 | 4/2006 | Molnar | |
| 7,039,125 | B2 | 5/2006 | Friedman | |
| 7,058,367 | B1 | 6/2006 | Luo et al. | |
| 7,062,294 | B1 | 6/2006 | Rogard et al. | |
| 7,068,628 | B2 | 6/2006 | Li et al. | |
| 7,072,381 | B2 | 7/2006 | Atarashi et al. | |
| 7,072,410 | B1 | 7/2006 | Monsen | |
| 7,088,671 | B1 | 8/2006 | Monsen | |

| | | |
|---|---|---|
| 7,095,709 B2 | 8/2006 | Walton et al. |
| 7,099,377 B2 | 8/2006 | Berens et al. |
| 7,103,325 B1 | 9/2006 | Jia et al. |
| 7,110,378 B2 * | 9/2006 | Onggosanusi et al. ....... 370/334 |
| 7,110,463 B2 | 9/2006 | Wallace et al. |
| 7,113,499 B2 | 9/2006 | Nafie et al. |
| 7,116,652 B2 | 10/2006 | Lozano |
| 7,127,009 B2 | 10/2006 | Berthet et al. |
| 7,130,362 B2 | 10/2006 | Girardeau et al. |
| 7,133,459 B2 | 11/2006 | Onggosanusi et al. |
| 7,137,047 B2 | 11/2006 | Mitlin et al. |
| 7,149,239 B2 | 12/2006 | Hudson |
| 7,151,809 B2 | 12/2006 | Ketchum et al. |
| 7,155,171 B2 | 12/2006 | Ebert et al. |
| 7,158,563 B2 | 1/2007 | Ginis et al. |
| 7,164,669 B2 | 1/2007 | Li et al. |
| 7,184,713 B2 | 2/2007 | Kadous et al. |
| 7,187,646 B2 | 3/2007 | Schramm |
| 7,190,749 B2 | 3/2007 | Levin et al. |
| 7,191,381 B2 | 3/2007 | Gesbert et al. |
| 7,194,237 B2 | 3/2007 | Sugar et al. |
| 7,197,084 B2 | 3/2007 | Ketchum et al. |
| 7,200,404 B2 | 4/2007 | Panasik et al. |
| 7,206,354 B2 | 4/2007 | Wallace et al. |
| 7,218,684 B2 | 5/2007 | Bolourchi et al. |
| 7,224,704 B2 | 5/2007 | Lu et al. |
| 7,231,184 B2 | 6/2007 | Eilts et al. |
| 7,233,625 B2 | 6/2007 | Ma et al. |
| 7,238,508 B2 | 7/2007 | Lin et al. |
| 7,242,727 B2 | 7/2007 | Liu et al. |
| 7,248,638 B1 | 7/2007 | Banister |
| 7,248,841 B2 | 7/2007 | Agee et al. |
| 7,254,171 B2 | 8/2007 | Hudson |
| 7,260,153 B2 | 8/2007 | Nissani |
| 7,260,366 B2 | 8/2007 | Lee et al. |
| 7,263,119 B1 | 8/2007 | Hsu et al. |
| 7,274,734 B2 | 9/2007 | Tsatsanis |
| 7,280,625 B2 | 10/2007 | Ketchum et al. |
| 7,283,508 B2 | 10/2007 | Choi et al. |
| 7,289,570 B2 | 10/2007 | Schmidl et al. |
| 7,292,854 B2 | 11/2007 | Das et al. |
| 7,298,778 B2 | 11/2007 | Visoz et al. |
| 7,308,035 B2 | 12/2007 | Rouquette et al. |
| 7,310,304 B2 | 12/2007 | Mody et al. |
| 7,317,750 B2 | 1/2008 | Shattil |
| 7,324,429 B2 | 1/2008 | Walton et al. |
| 7,327,800 B2 | 2/2008 | Oprea et al. |
| 7,342,912 B1 | 3/2008 | Kerr et al. |
| 7,356,004 B2 | 4/2008 | Yano et al. |
| 7,356,089 B2 | 4/2008 | Jia et al. |
| 7,379,492 B2 | 5/2008 | Hwang |
| 7,386,076 B2 | 6/2008 | Onggosanusi et al. |
| 7,392,014 B2 | 6/2008 | Baker et al. |
| 7,403,748 B1 | 7/2008 | Keskitalo et al. |
| 7,421,039 B2 | 9/2008 | Malaender et al. |
| 7,453,844 B1 | 11/2008 | Lee et al. |
| 7,480,278 B2 | 1/2009 | Pedersen et al. |
| 7,492,737 B1 * | 2/2009 | Fong et al. .................... 370/331 |
| 7,548,506 B2 | 6/2009 | Ma et al. |
| 7,551,546 B2 | 6/2009 | Ma et al. |
| 7,551,580 B2 | 6/2009 | Du Crest et al. |
| 7,599,443 B2 | 10/2009 | Ionescu et al. |
| 7,603,141 B2 | 10/2009 | Dravida |
| 7,606,296 B1 | 10/2009 | Hsu et al. |
| 7,636,573 B2 | 12/2009 | Walton et al. |
| 7,653,142 B2 | 1/2010 | Ketchum et al. |
| 7,653,415 B2 | 1/2010 | Van Rooyen |
| 2001/0017881 A1 | 8/2001 | Bhatoolaul et al. |
| 2001/0031621 A1 | 10/2001 | Schmutz |
| 2001/0046205 A1 | 11/2001 | Easton et al. |
| 2002/0003774 A1 | 1/2002 | Wang et al. |
| 2002/0018310 A1 | 2/2002 | Hung |
| 2002/0018453 A1 | 2/2002 | Yu et al. |
| 2002/0027951 A1 | 3/2002 | Gormley et al. |
| 2002/0041632 A1 | 4/2002 | Sato et al. |
| 2002/0044591 A1 | 4/2002 | Lee et al. |
| 2002/0044610 A1 | 4/2002 | Jones |
| 2002/0057659 A1 | 5/2002 | Ozluturk et al. |
| 2002/0064214 A1 | 5/2002 | Hattori et al. |
| 2002/0075830 A1 | 6/2002 | Hartman, Jr. |
| 2002/0085620 A1 | 7/2002 | Mesecher |
| 2002/0085641 A1 | 7/2002 | Baum |
| 2002/0098872 A1 | 7/2002 | Judson |
| 2002/0105928 A1 | 8/2002 | Kapoor et al. |
| 2002/0115473 A1 | 8/2002 | Hwang et al. |
| 2002/0122381 A1 | 9/2002 | Wu et al. |
| 2002/0122393 A1 | 9/2002 | Caldwell et al. |
| 2002/0154705 A1 | 10/2002 | Walton et al. |
| 2002/0183010 A1 | 12/2002 | Catreux et al. |
| 2002/0184453 A1 | 12/2002 | Hughes et al. |
| 2002/0191535 A1 | 12/2002 | Sugiyama et al. |
| 2002/0193146 A1 | 12/2002 | Wallace et al. |
| 2002/0196842 A1 * | 12/2002 | Onggosanusi et al. ....... 375/148 |
| 2003/0002450 A1 | 1/2003 | Jalali et al. |
| 2003/0003863 A1 * | 1/2003 | Thielecke et al. .............. 455/39 |
| 2003/0012308 A1 | 1/2003 | Sampath et al. |
| 2003/0039317 A1 | 2/2003 | Taylor et al. |
| 2003/0043929 A1 * | 3/2003 | Sampath ....................... 375/267 |
| 2003/0045288 A1 | 3/2003 | Luschi et al. |
| 2003/0048856 A1 | 3/2003 | Ketchum et al. |
| 2003/0076812 A1 | 4/2003 | Benedittis |
| 2003/0078024 A1 | 4/2003 | Magee et al. |
| 2003/0095197 A1 | 5/2003 | Wheeler et al. |
| 2003/0099306 A1 | 5/2003 | Nilsson et al. |
| 2003/0112745 A1 | 6/2003 | Zhuang et al. |
| 2003/0112880 A1 | 6/2003 | Walton et al. ................. 375/260 |
| 2003/0119452 A1 | 6/2003 | Kim et al. |
| 2003/0123381 A1 * | 7/2003 | Zhuang et al. ................ 370/208 |
| 2003/0123389 A1 | 7/2003 | Russell et al. |
| 2003/0125040 A1 | 7/2003 | Walton et al. |
| 2003/0128656 A1 | 7/2003 | Scarpa |
| 2003/0139194 A1 | 7/2003 | Onggosanusi et al. |
| 2003/0153360 A1 | 8/2003 | Burke et al. |
| 2003/0157954 A1 | 8/2003 | Medvedev et al. |
| 2003/0162519 A1 * | 8/2003 | Smith et al. .................. 455/277.1 |
| 2003/0185311 A1 | 10/2003 | Kim |
| 2003/0202492 A1 | 10/2003 | Akella et al. |
| 2003/0202612 A1 | 10/2003 | Halder et al. |
| 2003/0206558 A1 | 11/2003 | Parkkinen et al. |
| 2003/0235149 A1 * | 12/2003 | Chan et al. .................... 370/206 |
| 2003/0235255 A1 | 12/2003 | Ketchum et al. |
| 2004/0005887 A1 | 1/2004 | Bahrenburg et al. |
| 2004/0037257 A1 | 2/2004 | Ngo |
| 2004/0052228 A1 | 3/2004 | Tellado et al. |
| 2004/0071104 A1 | 4/2004 | Boesel et al. |
| 2004/0071107 A1 | 4/2004 | Kats et al. |
| 2004/0076224 A1 | 4/2004 | Onggosanusi et al. |
| 2004/0082356 A1 | 4/2004 | Walton et al. |
| 2004/0085939 A1 | 5/2004 | Wallace et al. |
| 2004/0120411 A1 | 6/2004 | Walton et al. |
| 2004/0136349 A1 | 7/2004 | Walton et al. |
| 2004/0151108 A1 | 8/2004 | Blasco Claret et al. |
| 2004/0151122 A1 | 8/2004 | Lau et al. |
| 2004/0156328 A1 | 8/2004 | Walton et al. |
| 2004/0160987 A1 | 8/2004 | Sudo et al. |
| 2004/0176097 A1 | 9/2004 | Wilson et al. |
| 2004/0179627 A1 | 9/2004 | Ketchum et al. |
| 2004/0184398 A1 | 9/2004 | Walton et al. |
| 2004/0198276 A1 | 10/2004 | Tellado et al. |
| 2004/0252632 A1 | 12/2004 | Bourdoux et al. |
| 2005/0047384 A1 | 3/2005 | Wax et al. |
| 2005/0047515 A1 | 3/2005 | Walton et al. |
| 2005/0099974 A1 | 5/2005 | Kats et al. |
| 2005/0111599 A1 | 5/2005 | Walton et al. |
| 2005/0120097 A1 | 6/2005 | Walton et al. |
| 2005/0128953 A1 | 6/2005 | Wallace et al. |
| 2005/0135284 A1 | 6/2005 | Nanda et al. |
| 2005/0135295 A1 | 6/2005 | Walton et al. |
| 2005/0135318 A1 | 6/2005 | Walton et al. |
| 2005/0147177 A1 | 7/2005 | Seo et al. |
| 2005/0185575 A1 | 8/2005 | Hansen et al. |
| 2005/0208959 A1 | 9/2005 | Chen et al. |
| 2005/0220211 A1 | 10/2005 | Shim et al. |
| 2005/0227628 A1 | 10/2005 | Inanoglu |
| 2005/0276343 A1 | 12/2005 | Jones |
| 2006/0018395 A1 | 1/2006 | Tzannes |
| 2006/0067417 A1 | 3/2006 | Park et al. |
| 2006/0072649 A1 | 4/2006 | Chang et al. |

| | | | | | | |
|---|---|---|---|---|---|---|
| 2006/0077935 | A1 | 4/2006 | Hamalainen et al. | JP | 9512156 | 12/1997 |
| 2006/0104196 | A1* | 5/2006 | Wu et al. ............... 370/208 | JP | 10028077 | 1/1998 |
| 2006/0153237 | A1 | 7/2006 | Hwang et al. | JP | 10084324 | 3/1998 |
| 2006/0159120 | A1 | 7/2006 | KIm | JP | 10209956 A | 8/1998 |
| 2006/0183497 | A1 | 8/2006 | Paranchych et al. | JP | 10303794 A | 11/1998 |
| 2006/0209894 | A1 | 9/2006 | Tzannes et al. | JP | 10327126 | 12/1998 |
| 2006/0209937 | A1 | 9/2006 | Tanaka et al. | JP | 1141159 | 2/1999 |
| 2007/0177681 | A1 | 8/2007 | Choi et al. | JP | 11069431 A | 3/1999 |
| 2007/0274278 | A1 | 11/2007 | Choi et al. | JP | 11074863 A | 3/1999 |
| 2008/0069015 | A1 | 3/2008 | Walton et al. | JP | 11163823 A | 6/1999 |
| 2008/0267098 | A1 | 10/2008 | Walton et al. | JP | 11205273 | 7/1999 |
| 2008/0267138 | A1 | 10/2008 | Walton et al. | JP | 11252037 A | 9/1999 |
| 2008/0285488 | A1 | 11/2008 | Walton et al. | JP | 2991167 | 12/1999 |
| 2008/0285669 | A1 | 11/2008 | Walton et al. | JP | 2000078105 | 3/2000 |
| 2008/0285670 | A1 | 11/2008 | Walton et al. | JP | 2000092009 A | 3/2000 |
| 2010/0067401 | A1 | 3/2010 | Medvedev et al. | JP | 2001044930 A | 2/2001 |
| 2010/0119001 | A1 | 5/2010 | Walton et al. | JP | 200186045 | 3/2001 |
| 2010/0142636 | A1 | 6/2010 | Heath, Jr. et al. | JP | 2001186051 A | 7/2001 |
| 2010/0183088 | A1 | 7/2010 | Inanoglu | JP | 2001217896 | 8/2001 |
| 2010/0260060 | A1 | 10/2010 | Abraham et al. | JP | 2001231074 | 8/2001 |
| | | | | JP | 2001237751 | 8/2001 |

FOREIGN PATENT DOCUMENTS

| | | |
|---|---|---|
| JP | 200264879 | 2/2002 |
| CA | 2690247 | 10/2001 |
| JP | 2002504283 | 2/2002 |
| CN | 1086061 | 4/1994 |
| JP | 200277098 | 3/2002 |
| CN | 1234661 | 11/1999 |
| JP | 200277104 | 3/2002 |
| CN | 1308794 | 8/2001 |
| JP | 2002111627 | 4/2002 |
| CN | 1347609 A | 5/2002 |
| JP | 2002-176379 | 6/2002 |
| CN | 1469662 | 1/2004 |
| JP | 2002164814 | 6/2002 |
| CN | 1489836 A | 4/2004 |
| JP | 2002204217 | 7/2002 |
| CN | 1537371 | 10/2004 |
| JP | 2002232943 A | 8/2002 |
| DE | 19951525 A1 | 6/2001 |
| JP | 2003504941 | 2/2003 |
| EP | 0755090 A1 | 1/1997 |
| JP | 2003198442 | 7/2003 |
| EP | 0762701 | 3/1997 |
| JP | 2003530010 | 10/2003 |
| EP | 0772329 | 5/1997 |
| JP | 2004266586 | 9/2004 |
| EP | 0805568 A1 | 11/1997 |
| JP | 2004297172 | 10/2004 |
| EP | 0869647 A2 | 10/1998 |
| JP | 2004535694 | 11/2004 |
| EP | 0895387 A1 | 2/1999 |
| JP | 2005519520 | 6/2005 |
| EP | 0929172 A1 | 7/1999 |
| JP | 2006504372 | 2/2006 |
| EP | 0951091 A2 | 10/1999 |
| KR | 200011799 | 2/2000 |
| EP | 0991221 A2 | 4/2000 |
| KR | 20010098861 | 11/2001 |
| EP | 0993211 | 4/2000 |
| KR | 20020003370 | 1/2002 |
| EP | 1 117 197 A2 | 12/2000 |
| KR | 20030085040 | 11/2003 |
| EP | 1061446 | 12/2000 |
| KR | 20060095576 A | 8/2006 |
| EP | 1075093 | 2/2001 |
| RU | 2015281 C1 | 6/1994 |
| EP | 1087545 A1 | 3/2001 |
| RU | 2139633 | 10/1999 |
| EP | 1117197 | 7/2001 |
| RU | 2141168 | 11/1999 |
| EP | 1 185 001 A2 | 8/2001 |
| RU | 2149509 | 5/2000 |
| EP | 1126673 A2 | 8/2001 |
| RU | 2152132 C1 | 6/2000 |
| EP | 1133070 | 9/2001 |
| RU | 2157592 | 10/2000 |
| EP | 1137217 | 9/2001 |
| RU | 2158479 C2 | 10/2000 |
| EP | 1143754 A1 | 10/2001 |
| RU | 2168278 | 5/2001 |
| EP | 1170879 A1 | 1/2002 |
| RU | 2197781 C2 | 1/2003 |
| EP | 1175022 A2 | 1/2002 |
| RU | 2201034 C2 | 3/2003 |
| EP | 1182799 A2 | 2/2002 |
| RU | 2335852 C2 | 10/2008 |
| EP | 1185001 | 3/2002 |
| TW | 419912 | 1/2001 |
| EP | 1185015 | 3/2002 |
| TW | 545006 B | 8/2003 |
| EP | 1185048 A2 | 3/2002 |
| TW | 583842 B | 4/2004 |
| EP | 1207635 A1 | 5/2002 |
| TW | I230525 | 4/2005 |
| EP | 1207645 | 5/2002 |
| WO | WO8607223 | 12/1986 |
| EP | 1223702 A1 | 7/2002 |
| WO | WO9307684 A1 | 4/1993 |
| EP | 1241824 | 9/2002 |
| WO | WO9507578 | 3/1995 |
| EP | 1265411 | 12/2002 |
| WO | WO9530316 A1 | 11/1995 |
| EP | 1315311 A1 | 5/2003 |
| WO | WO9532567 A1 | 11/1995 |
| EP | 1379020 | 1/2004 |
| WO | WO9622662 A1 | 7/1996 |
| EP | 1387545 | 2/2004 |
| WO | WO9635268 | 11/1996 |
| EP | 1416688 A1 | 5/2004 |
| WO | WO9719525 A1 | 5/1997 |
| EP | 1447934 A1 | 8/2004 |
| WO | WO9736377 A1 | 10/1997 |
| EP | 1556984 A2 | 7/2005 |
| WO | WO9809381 A | 3/1998 |
| GB | 2300337 | 10/1996 |
| WO | WO9809395 | 3/1998 |
| GB | 2373973 A | 10/2002 |
| WO | WO9824192 A1 | 6/1998 |
| JP | 1132027 | 5/1989 |
| WO | WO98026523 | 6/1998 |
| JP | 03104430 | 5/1991 |
| WO | WO9830047 A1 | 7/1998 |
| JP | 06003956 | 1/1994 |
| WO | WO9857472 | 12/1998 |
| JP | 6501139 T | 1/1994 |
| WO | WO9903224 | 1/1999 |
| JP | 8274756 A | 10/1996 |
| WO | WO09014878 | 3/1999 |
| JP | 9135230 | 5/1997 |
| WO | WO9916214 | 4/1999 |
| JP | 9266466 | 10/1997 |
| WO | WO9944379 A1 | 9/1999 |
| JP | 9307526 A | 11/1997 |
| WO | WO9957820 | 11/1999 |
| JP | 09327073 | 12/1997 |
| WO | WO0011823 A1 | 3/2000 |

| | | |
|---|---|---|
| WO | WO0036764 A2 | 6/2000 |
| WO | WO0062456 | 10/2000 |
| WO | WO0105067 A1 | 1/2001 |
| WO | WO0126269 | 4/2001 |
| WO | WO0169801 | 9/2001 |
| WO | WO0171928 | 9/2001 |
| WO | 0176110 | 10/2001 |
| WO | WO0180510 A1 | 10/2001 |
| WO | WO0182521 A2 | 11/2001 |
| WO | WO0197400 | 12/2001 |
| WO | 0203557 | 1/2002 |
| WO | WO0201732 A2 | 1/2002 |
| WO | WO0215433 A1 | 2/2002 |
| WO | WO0225853 A2 | 3/2002 |
| WO | WO02060138 | 8/2002 |
| WO | WO02062002 A1 | 8/2002 |
| WO | WO02065664 | 8/2002 |
| WO | WO02069523 A1 | 9/2002 |
| WO | WO02069590 A1 | 9/2002 |
| WO | WO02073869 A1 | 9/2002 |
| WO | WO02078211 A2 | 10/2002 |
| WO | WO02082689 A2 | 10/2002 |
| WO | WO02088656 | 11/2002 |
| WO | WO02093784 A1 | 11/2002 |
| WO | WO02099992 | 12/2002 |
| WO | WO03010984 A1 | 2/2003 |
| WO | WO03010994 A1 | 2/2003 |
| WO | WO03028153 | 4/2003 |
| WO | WO03034646 A2 | 4/2003 |
| WO | Wo03047140 A1 | 6/2003 |
| WO | WO03075479 | 9/2003 |
| WO | WO2004002011 | 12/2003 |
| WO | WO2004002047 | 12/2003 |
| WO | WO2004038985 A2 | 5/2004 |
| WO | WO2004038986 | 5/2004 |
| WO | WO2004039011 A2 | 5/2004 |
| WO | WO2004039022 | 5/2004 |
| WO | WO2005041515 | 5/2005 |
| WO | WO2005043855 | 5/2005 |
| WO | WO2005046113 A2 | 5/2005 |

OTHER PUBLICATIONS

Miyashita et al, "High Data-rate Transmission with Eigenbeamspace Division Multiplexing (E-SDM) in a MIMO Channel", VTC 2002-Fall. 2002 IEEE 56$^{th}$. Vehicular Technology Conference Proceedings. Vancouver, Canada, Sep. 24-28, 2002, IEEE Vechicular Technology Conference, New York, NY: IEEE, US, vol. 1 of 4. Conf. 56, (Sep. 24, 2002), pp. 1302-1306.
Kiessling et al, "Short-Term and Long-Term Diagonalization of Correlated MIMO Channels With Adaptive Modulation", IEEE Conference, vol. 2, (Sep. 15, 2002), pp. 593-597.
Gao et al, "On Implementation of Bit-Loading Algorithms for OFDM Systems With Multiple-Input Multiple-Output", VTC 2002-Fall. 2002 IEEE 56$^{th}$. Vehicular Technology Conference Proceedings. Vancouver, Canada, Sep. 24-28, 2002, IEEE Vechicular Technology Conference, New York, NY: IEEE, US, vol. 1 of 4. Conf. 56, (Sep. 24, 2002), pp. 199-203.
International Search Report—PCT/US03/026395, International Search Authority—European Patent Office Dec. 19, 2003.
Gao, et al. "On implementation of Bit-Loading Algorithms for OFDM Systems with Multplei-Input Multiple Output," VTC 2002-Fall, 2002 IEEE 56th, Vehicular Technology Conference Proceedings. Vancouver, Canada, Sep. 24-28, 2002, IEEE Vehicular Technology Conference, New York, NY: IEEE, US, vol. 1 of 4. Conf. 56, (Sep. 24, 2002), pp. 199-203.
Kiessling, et al., "Short-Term and Long Term Diagonalization of Correlated MIMO Channels with Adaptive Modulation," IEEE Conference, vol. 2, (Sep. 15, 2002), pp. 593-597.
Miyashita, et al., "High Data-Rate Transmission with Eigenbeam-Space Division Multiplexing (E-SDM) in a MIMO Channel," VTC 2002-Fall. 2002 IEEE 56th. Vehicular Technology Conference Proceedings. Vancouver, Canada, Sep. 24-28, 2002, IEEE Vehicular Technology Conference, New York, NY: IEEE, US, vol. 1 of 4 Conf. 56, (Sep. 24, 2002). pp. 1302-1306.

International Preliminary Examination Report—PCT/US03-026395. IPEA/US—Dec. 20, 2004.
3GPP2 TIS/RIS/ID-2000.2-A, "Physical Layer Standard for cdma2000 Spread Spectrum Systems", (Mar. 2000).
Alamouti, S.M., "A Simple Transmit Diversity Technique for Wireless Communications," IEEE Journal on Select Areas in Communications, vol. 16, no. 8, Oct. 1998, pp. 1451-1458.
Chen, K.C. et al., "Novel Space-Time Processing of DS/CDMA Multipath Signal," IEEE 49th, Vehicular Technology Conference. Houston, Texas, May 16-20, 1999, pp. 1809- 1813.
Choi, R. et al., "MIMO Transmit Optimization for Wireless Communication Systems," Proceedings of the First IEEE International workshops on Electronic Design, pp. 1-6, Piscataway, New Jersey, Jan. 29-31 (2002).
Chung, J. et al: "Multiple antenna systems for 802.16 systems." IEEE 802.16 Broadband Wireless Access Working Group <http://ieee802.org/16>, IEEE 802.16abc-01/31, Sep. 7, 2001.
D.A. Gore, R.U. Nabar, A. Paulraj, "Selecting an optimal set of transmit antennas for a low rank matrix channel," icassp, vol. 5, pp. 2785-2788, Acoustics, Speech, and Signal Processing, (2000), 2000 IEEE International Conference.
Diggavi, S. et al., "Intercarrier interference in MIMO OFDM," IEEE International Conference on Communications, 2002, vol. 1, 485-489.
ETSI TS 101 761-1 v1.3.1, "Broadband Radio Access Networks (BRAN); HIPERLAN Type 2; Data Link Control (DLC) Layer; Part 1: Basic Data Transport Functions," ETSI Standards, European Telecommunications Standards Institute BR (V131), pp. 1-88 (Dec. 2001).
European Search Report—EP08012143,7, Search Authority—Munich Patent Office, Jan. 19, 2011.
Fujii, M.: "Pseudo-Orthogonal Multibeam-Time Transmit Diversity for OFDM-CDMA" pp.222-226 (2002).
Hassibi B., et al, "High Rate Codes That Are Linear in Space and Time," Lucent Technologies, 2002, pp. 1-55.
Haustein, T. et at.: "Performance of MIMO Systems with Channel Inversion," IEEE 55th Vehicular Technology Conference, Birmingham, Alabama, May 6-9 (2002), pp. 35-39.
Hayashi, K. A New Spatio-Temporal Equalization Method Based on Estimated Channel Response, Sep. 2001, IEEE Transaction on Vehicular Technology, vol. 50, Issue 5, pp. 1250-1259.
Hong, D. K. et al.: "Robust Frequency Offset Estimation for Pilot Symbol Assisted Packet CDMA with MIMO Antenna Systems," IEEE Communications Letters, vol. 6, No. 6, pp. 262-264, XP-001133262 (Jun. 2002).
IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.
Iiserte et al., "Joint beamforming strategies in OFDM-MIMO systems," 2002, sections 2 and 3, Department of Signal Theory and Communications.
Joham, M. et al.: "Symbol Rate Processing for the Downlink of DS-CDMA Systems", 374 IEEE Journal on Selected Areas in Communications, vol. 19, No. 1, paragraphs 1, 2, IEEE Service Center, Piscataway, US, (Jan. 1, 2001), XP011055296, ISSN: 0733-8716.
John A.C. Bingham, "Multicarrier Modulation for Data Transmission: An Idea Whose Time Has Come", IEEE Communications Magazine, p. 14 (May 1990).
Jongren et al., Utilizing Quantized Feedback Information in Orthogonal Space-Time Coding, 2000 IEEE Global Telecommunications Conference, 2(4): 995-999, Nov. 27, 2000.
Kousa et al.: "Multi channel adaptive forward error-correction system", Communications Speech and Vision, IEEE Processings I, vol. 140, Issue 5, Oct. 1993, pp. 357-360, 362.
L. Deneire. at al. "A Low Complexity Ml Channel Estimator for OFDM," • Proc IEEE ICC June 2001 pp. 1461-1465.
Lebrun G. et al. , "MIMO transmission over a time varying TDD channel using SVD," Electronics Letters, 2001, vol. 37, 1363-1364.
Li et al., "Simplified Channel Estimation for OFDM Systems with Multiple Transmit Antennas," IEEE Transactions on Wireless Communications, Jan. 2002, vol. 1, No. 67-75.
Li, Lihua et al, "A practical space-frequency block coded OFDM scheme for fast fading broadband channels," 2002. The 13th IEEE International Symposium on Personal, Indoor and Mobile Radio communications, vol. 1, 15-18 Sep. 2002. pp. 212-216 vol. 1.
Pautler, J. at al.: "On Application of Multiple-Input Multiple-Output Antennas to CDMA Cellular Systems," IEEE 54th Vehicular Technology Conference Proceedings, Atlantic City, New Jersey, Oct. 7-11 (2001), pp. 1508-1512.
Sampath H., at al., "Joint transmit and receive optimization for high data rate wireless communication using multiple antennas, XP010373976," 2002, 215-219.
S.W. Wales, "A mimo technique within the UTRA TDD standard." MIMO: Communications Systems from Concept to Implementations (Ref. No. 2001/175), IEE Seminar on Dec. 12, 2001, pp. 1-8.
Tarighat, A. at al. "Performance Analysis of Different Algorithms for cdma2000 Antenna Array System and a New Multi User Beamforming (MUB) Algorithm", Wireless Communications and Networking Conference, vol. 1, pp. 409-414, Sep. 23, 2000.
The Authoritative Dictionary of IEEE Standards Terms, Seventh Edition, IEEE Press: York (Dec. 2000), p. 902.
Theon, S. et al.: "Improved Adaptive Downlink for OFDM/SDMA-Based Wireless Networks," IEEE VTS 53rd Vehicular Technology Conference, pp. 707-711, Rhodes, Greece, May 6-9, (2001).
Tujkovic, D.: "High bandwidth efficiency space-time turbo coded modulation", Institute of Electrical and Electronics Engineers, ICC 2001. 2001 IEEE International Conference on Communications, Conference Record, pp. 1104-1109, Helsinki, Finland, Jun. 11-14 (2001).
U.S. Appl. No. 60/421,309.
U.S. Appl. No. 60/421,428.
Van Zelst, A. at al,: "Space Division Multiplexing (SDM) for OFDM Systems," IEEE 51st Vehicular Technology Conference Proceedings, pp. 1070-1074, Tokyo, Japan, May 15-18 (2000).
Warner, W. at al.: "OFDM/FM Frame Synchronization for Mobile Radio Data Communication", IEEE Transactions on Vehicular Technology, Aug. 1993, vol. 42, 3, pp. 302-313.
Woiniansky at al, "V-BLAST: An Architecture for Realizing Very High Data Rates over Rich-Scattering Wireless Channel," Proc. ISSSE-98, 1998, Pisa, Italy pp. 295-300.
Wong K. K., at al., "Optimizing time and space MIMO antenna system for frequency 34 selective fading channels," 2001, Sections II and III and V, 1396.

Yoshiki, T., at al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.
European Search Report—EP10173988—Search Authority—Munich—Mar. 3, 2011.
Office Action in Canadian Application 2501634 corresponding To U.S. Appl. No. 10/610,446, citing CA2690247 dated Feb. 25, 2011.
Translation of Office Action in Japanese Application Application 2005-501686 corresponding to U.S. Appl. No. 10/375,162 , citing JP09135230 dated Feb. 15, 2011.
Office Action dated Aug. 13, 2008 for Australian Application Serial No. 2004223374, 2 pages.
Office Action dated Jun. 27, 2008 for Chinese Application Serial No. 200480011307.6, 3 pages.
Strang Gilbert:. "Linear Algebra and Its Applications," Second Edition, Academic Press, 1980.
Grunheid, R. et al., "Adaptive Modulation and Multiple Access for the OFDM Transmission Technique," Wireless Personal Communications 13: May 13, 2000, 2000 Kluwer Academic Publishers, pp. 4-13, XP000894156.
Le Goff, S. et al: "Turbo-codes and high spectral efficiency modulation," IEEE International Conference on Communications, 1994. ICC '94, Supercomm/Icc '94, Conference Record, 'Serving Humanity Through Communications.' pp. 645-649, vol. 2, May 1-5, 1994, XP010126658, doi: 10.1109/ICC.1994.368804.
Song, Bong-Gee et al., "Prefilter design using the singular value decomposition for MIMO equalization," 1996 Conference Record of the Thirtieth Asilomar Conference on Signals, Systems and Computers, vol. 1, pp. 34-38, Nov. 3-6, 1996, XP010231388, DOI: 10.1109/ACSSC.1996.600812, p. 35, column 2, paragraph 4 through p. 36, column 1.
Vook F W et al., "Adaptive antennas for OFDM", Vehicular Technology Conference, vol. 1, May 18, 1998 (1998-05-181, - May, 21 1998, pp. 606-610, XP010287858, New York, NY, USA, IEEE, US DOI: 10.1109/VETEC.1998.686646 ISBN: 978-0/7803-4320-7.
Wyglinski, Alexander. "Physical Layer Loading Algorithms for Indoor Wireless Multicarrier Systems," Thesis Paper, McGill University, Montreal, Canada, Nov. 2004, p. 109.

* cited by examiner

CODED MIMO SYSTEMS WITH SELECTIVE CHANNEL INVERSION APPLIED PER EIGENMODE

BACKGROUND

1. Field

The present invention relates generally to data communication, and more specifically to techniques for performing selective channel inversion per eigenmode for MIMO systems.

2. Background

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel or eigenmode of the MIMO channel.

The spatial subchannels of a wideband MIMO system may encounter different channel conditions due to various factors such as fading and multipath. Each spatial subchannel may thus experience frequency selective fading, which is characterized by different channel gains at different frequencies of the overall system bandwidth. Assuming no power control, this then results in different signal-to-noise-and-interference ratios (SNRs) at different frequencies of each spatial subchannel, which would then be able to support different data rates for a particular level of performance (e.g., 1% packet error rate).

To combat frequency selective fading in a wideband channel, orthogonal frequency division multiplexing (OFDM) may be used to effectively partition the overall system bandwidth into a number of ($N_F$) subbands, which are also referred to as frequency bins or subchannels. With OFDM, each subband is associated with a respective subcarrier upon which data may be modulated. For a MIMO system that utilizes OFDM (i.e., a MIMO-OFDM system), each subband of each spatial subchannel may be viewed as an independent transmission channel.

A key challenge in a coded communication system is the selection of the appropriate data rates and coding and modulation schemes to use for a data transmission based on the channel conditions. A major goal for the system is to maximize spectral efficiency while reducing complexity for both the transmitter and receiver.

One straightforward technique for selecting data rates and coding and modulation schemes is to "bit load" each transmission channel in the system according to its transmission capability. However, this technique has several major drawbacks. First, coding and modulating individually for each transmission channel can significantly increase the complexity of the processing at both the transmitter and receiver. Second, coding individually for each transmission channel may greatly increase coding and decoding delay.

There is, therefore, a need in the art for techniques to achieve high spectral efficiency in MIMO systems without having to individually code for each transmission channel.

SUMMARY

Techniques are provided herein to perform selective channel inversion per eigenmode in a MIMO system to achieve high spectral efficiency while reducing complexity at both the transmitter and receiver. The available transmission channels are arranged into a number of groups, where each group may include all transmission channels (or frequency bins) for an eigenmode of a MIMO channel. The total transmit power is allocated to the groups using a particular power allocation scheme (e.g., uniform power allocation, water-filling, and so on). Selective channel inversion is then performed independently for each group selected for use for data transmission (i.e., with non-zero allocated transmit power). For each such group, one or more transmission channels in the group is selected for use, and a scaling factor is determined for each selected channel such that all selected channels for the group are inverted and achieve similar received signal quality (e.g., received SNR).

Various aspects and embodiments of the invention are described in further detail below. The invention further provides methods, program codes, digital signal processors, transmitter units, receiver units, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
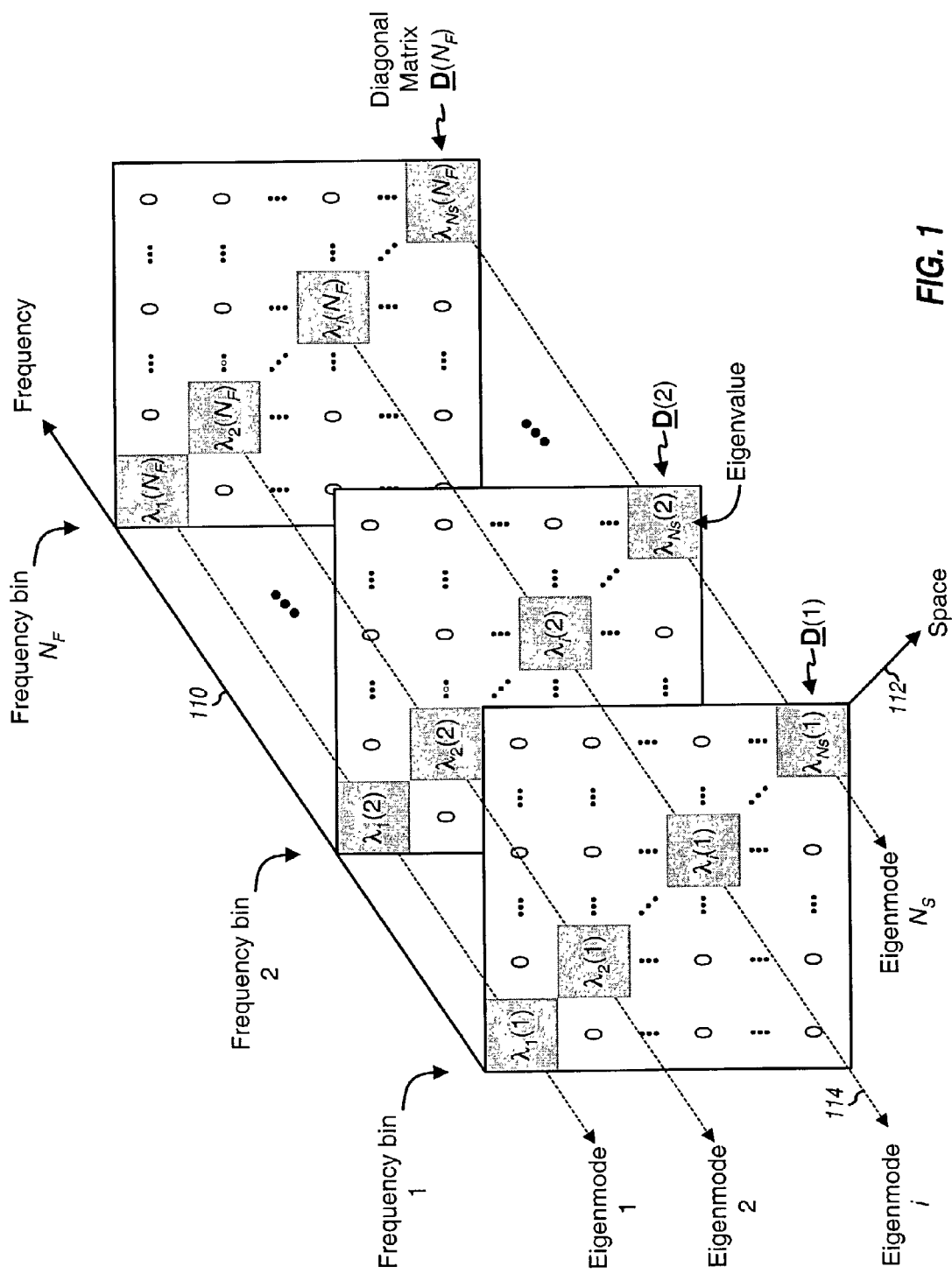
FIG. 1 graphically illustrates eigenvalue decomposition for a MIMO-OFDM system.

In a MIMO communication system, such as a multiple-antenna wireless communication system, the data streams transmitted from the $N_T$ transmit antennas interfere with each other at the receiver. One technique for combating this interference is to "diagonalize" the MIMO channel to obtain a number of independent channels.

The model for a MIMO system may be expressed as:

$$y = Hx + n, \quad \text{Eq (1)}$$

where
- y is a vector with $N_R$ entries, $\{y_i\}$ for $i \in \{1, \ldots, N_R\}$, for the symbols received by the $N_R$ receive antennas (i.e., the "received" vector);
- x is a vector with $N_T$ entries, $\{x_j\}$ for $j \in \{1, \ldots, N_T\}$, for the symbols transmitted from the $N_T$ transmit antennas (i.e., the "transmitted" vector);
- H is an ($N_R \times N_T$) channel response matrix that contains the transfer functions (i.e., complex gains) from the $N_T$ transmit antennas to the $N_R$ receive antennas; and
- n is additive white Gaussian noise (AWGN) with a mean vector of 0 and a covariance matrix of $\Lambda_n = \sigma^2 I$, where 0 is a vector of all zeros, I is the identity matrix with ones along the diagonal and zeros everywhere else, and $\sigma^2$ is the noise variance.

For simplicity, a flat-fading, narrowband channel is assumed. In this case, the channel response can be represented by a constant complex value for the entire system bandwidth, and the elements of the channel response matrix H are scalars. Although the assumption of frequency non-selectivity is assumed here for simplicity, the techniques described herein may be extended for frequency selective channels.

The channel response matrix H may be diagonalized by performing eigenvalue decomposition on the correlation matrix of H, which is $R=H^H H$. The eigenvalue decomposition of the ($N_T \times N_T$) correlation matrix R may be expressed as:

$$R=EDE^H, \quad \text{Eq (2)}$$

where
E is an ($N_T \times N_T$) unitary matrix whose columns are the eigenvectors $e_i$ of R, for $i \in \{1, \ldots, N_T\}$;
D is an ($N_T \times N_T$) diagonal matrix with entries on the diagonal corresponding to the eigenvalues of R; and
for any matrix M, $M^H$ denotes the conjugate transpose of M.

A unitary matrix is denoted by the property $E^H E = I$.

The eigenvalue decomposition may also be performed using singular value decomposition (SVD), which is known in the art.

The diagonal matrix D contains non-negative real values along the diagonal and zeros elsewhere. These diagonal entries are referred to as the eigenvalues of the matrix R and are indicative of the power gains for the independent channels of the MIMO channel. The number of independent channels for a MIMO system with $N_T$ transmit and $N_R$ receive antennas is the number of non-zero eigenvalues of R, $N_S \leq \min\{N_T, N_R\}$. These non-zero eigenvalues are denoted as $\{\lambda_i\}$, for $i = \{1, \ldots, N_S\}$.

Without taking into account power constraints for the $N_T$ transmit antennas, the MIMO channel may be diagonalized by pre-multiplying (or "preconditioning") a "data" vector s with the unitary matrix E to obtain the transmitted vector x. The preconditioning at the transmitter may be expressed as:

$$x=Es. \quad \text{Eq (3)}$$

At the receiver, the received vector y may be pre-multiplied (or "conditioned") with $E^H H^H$ to obtain an estimate of the data vector s. The conditioning to obtain the data vector estimate ŝ may be expressed as:

$$\begin{aligned} \hat{s} &= E^H H^H y \\ &= E^H H^H HEs + E^H H^H n \\ &= Ds + \hat{n}, \end{aligned} \quad \text{Eq (4)}$$

where ñ is AWGN with a mean vector of 0 and a covariance matrix of $\Lambda_{\hat{n}}=\sigma^2 D$.

As shown in equation (4), the preconditioning at the transmitter and the conditioning at the receiver result in the data vector s being transformed by an effective channel response represented by the matrix D, as well as a scaling of the noise elements. Since D is a diagonal matrix, there are effectively $N_S$ non-interfering, parallel channels. Each of these channels has a power gain equal to the square of the corresponding eigenvalue, $\lambda_i^2$, and a noise power equal to $\sigma^2 \lambda_i$ for $i \in \{1, \ldots, N_S\}$, yielding a signal-to-noise ratio of $\lambda_i/\sigma^2$. Thus, the power gain of each of these channels is equal to the eigenvalue, $\lambda_i$, for $i \in \{1, \ldots, N_S\}$. Parallel channel i is often referred to as eigenmode i or mode i. The diagonalization of the MIMO channel as shown in equations (3) and (4) can be achieved if the transmitter is provided with the channel response matrix H or equivalent information.

The eigenvalue decomposition described above may also be performed for a wideband, frequency-selective channel. For a MIMO-OFDM system, the wideband channel is divided into $N_F$ flat-fading, orthogonal frequency bins or subbands. The eigenvalue decomposition may then be performed independently for the channel response matrix H(k) for each frequency bin, k, to determine the $N_S$ spatial subchannels or eigenmodes for that frequency bin. Each spatial subchannel of each frequency bin is also referred to as a "transmission" channel.

The model for a MIMO-OFDM system may be expressed as:

$$y(k)=H(k)x(k)+n(k), \text{ for } k \in \{1, \ldots, N_F\}. \quad \text{Eq (5)}$$

where "(k)" denotes the k-th frequency bin.

The eigenvalue decomposition of the correlation matrix R(k) for each frequency bin may be expressed as:

$$R(k)=E(k)D(k)E^H(k). \quad \text{Eq (6)}$$

The non-zero eigenvalues for R(k) are denoted as $\{\lambda_i(k)\}$, for $i = \{1, \ldots, N_S\}$ and $k = \{1, \ldots, N_F\}$. Thus, for the MIMO-OFDM system, performing eigenmode decomposition for each of the $N_F$ frequency bins results in $N_S$ spatial subchannels or eigenmodes for each frequency bin, or a total of $N_S N_F$ transmission channels.

The eigenvalues may be provided in two forms—a "sorted" form and a "random-order" form. In the sorted form, the $N_S$ eigenvalues for each frequency bin are sorted in decreasing order so that $\{\lambda_1(k) \geq \lambda_2(k) \geq \ldots \geq \lambda_{N_S}(k)\}$, where $\lambda_1(k)$ is the largest eigenvalue for frequency bin k and $\lambda_{N_S}(k)$ is the smallest eigenvalue for frequency bin k. In the random-order form, the ordering of the eigenvalues may be random and further independent of frequency. The particular form selected for use, sorted or random-ordered, influences the selection of the eigenmodes for use for data transmission and the coding and modulation scheme to be used for each selected eigenmode, as described below.

FIG. 1 graphically illustrates the eigenvalue decomposition for the MIMO-OFDM system. The set of diagonal matrices, D(k) for $k = \{1, \ldots, N_F\}$, is shown arranged in order along an axis 110 that represents the frequency dimension. The eigenvalues, $\{\lambda_i(k)\}$ for $i = \{1, \ldots, N_S\}$, of each matrix D(k) are located along the diagonal of the matrix. Axis 112 may thus be viewed as representing the spatial dimension. The eigenmode i for all frequency bins (or simply, eigenmode i) is associated with a set of elements, $\{\lambda_i(k)\}$ for $k = \{1, \ldots, N_F\}$, which is indicative of the frequency response across all $N_F$ frequency bins for that eigenmode. The set of elements $\{\lambda_i(k)\}$ for each eigenmode is shown by the shaded boxes along a dashed line 114. Each shaded box in FIG. 1 represents a transmission channel. For each eigenmode that experiences frequency selective fading, the elements $\{\lambda_i(k)\}$ for that eigenmode may be different for different values of k.

If the eigenvalues in each diagonal matrix D(k) are sorted in descending order, then eigenmode 1 (which is also referred to as the principal eigenmode) would include the largest eigenvalue, $\lambda_1(k)$, in each matrix, and eigenmode $N_S$ would include the smallest eigenvalue, $\lambda_{N_S}(k)$, in each matrix.

The eigenvalue decomposition for each frequency bin in the MIMO-OFDM system results in a total of $N_S N_F$ eigenvalues for the $N_S N_F$ transmission channels over the entire bandwidth. Each transmission channel may achieve a different SNR and may be associated with different transmission capability. Various power allocation schemes (or transmission schemes) may be used to distribute the total transmit power to these transmission channels to achieve high overall spectral efficiency, which is given in units of bit/second per Hertz (bps/Hz). Some of these schemes are described in further detail below.

1. Water-Filling

The "water-filling" or "water-pouring" scheme may be used to optimally distribute the total transmit power across the transmission channels such that the overall spectral efficiency is maximized, under the constraint that the total transmit power at the transmitter is limited to $P_{total}$. The water-filling scheme distributes power over the $N_S N_F$ transmission channels such that the channels with increasingly higher SNRs receive increasingly greater fractions of the total transmit power. The transmit power allocated to a given transmission channel is determined by that channel's SNR, which may be given as $\lambda_i(k)/\sigma^2$, where $\lambda_i(k)$ is the i-th eigenvalue in the k-th frequency bin.

The procedure for performing water-filling is known in the art and not described herein. The result of the water-filling is a specific transmit power allocation to each of the $N_S N_F$ transmission channels, which is denoted as $P_i(k)$, for i={1, ..., $N_S$} and k={1, ..., $N_F$}. The power allocation is performed such that the following condition is satisfied:

$$P_{total} = \sum_{k \in K} \sum_{i \in L} P_i(k), \qquad \text{Eq (7)}$$

where L={1, ..., $N_S$} and K={1, ..., $N_F$}.

Based on the allocated transmit powers of $P_i(k)$, for i={1, ..., $N_S$} and k={1, ..., $N_F$}, the received SNR, $\gamma_i(k)$, for each transmission channel may be expressed as:

$$\gamma_i(k) = \frac{P_i(k)\lambda_i(k)}{\sigma^2}, \text{ for } i = \{1, \ldots, N_S\} \text{ and } k = \{1, \ldots, N_F\}. \qquad \text{Eq (8)}$$

The total spectral efficiency C for the $N_S N_F$ transmission channels may then be computed based on a continuous, monotonically increasing logarithmic function for capacity, as follows:

$$C = \sum_{k=1}^{N_F} \sum_{i=1}^{N_S} \log_2(1 + \gamma_i(k)). \qquad \text{Eq (9)}$$

In a typical communication system, the total range of received SNRs expected to be observed may be partitioned into a number of sub-ranges. Each sub-range may then be associated with a particular coding and modulation scheme chosen to yield the highest spectral efficiency for a given bit error rate (BER), frame error rate (FER), or packet error rate (PER). The water-filling power allocation may result in a different received SNR for each of the $N_S N_F$ transmission channels. This would then result in the use of many different coding/modulation schemes for the transmission channels. The coding/modulation per transmission channel increases the overall spectral efficiency at the expense of greater complexity for both the transmitter and receiver.

2. Selective Channel Inversion Applied to All Transmission Channels

The "SCI-for-all-channels" scheme performs selective channel inversion (SCI) on all transmission channels such that those selected for use achieve approximately equal received SNRs at the receiver. This would then allow a common coding and modulation scheme to be used for all selected transmission channels. This scheme greatly reduces complexity for both the transmitter and receiver in comparison to the water-filling scheme. The equalization of the received SNRs may be achieved by first selecting all or only a subset of the $N_S N_F$ available transmission channels for use for data transmission. The channel selection may result in the elimination of poor channels with low SNRs. The total transmit power $P_{total}$ is then distributed across the selected transmission channels in such a way that the received SNR is approximately equal for all selected transmission channels.

If "full" channel inversion is performed for all $N_S N_F$ available transmission channels, then the total transmit power $P_{total}$ may be allocated such that approximately equal signal power is received for all these channels. An appropriate amount of transmit power $P_i(k)$ to allocate to eigenmode i of frequency bin k may be expressed as:

$$P_i(k) = \frac{\alpha P_{total}}{\lambda_i(k)}, \qquad \text{Eq (10)}$$

where α is a normalization factor used to distribute the total transmit power among the available transmission channels. This normalization factor, α, may be expressed as:

$$\alpha = \frac{1}{\sum_{i \in L} \sum_{k = K} \lambda_i(k)^{-1}}. \qquad \text{Eq (11)}$$

The normalization factor, α, ensures approximately equal received signal power for all transmission channels, which is given as $\alpha P_{total}$. The total transmit power is thus effectively distributed (unevenly) across all available transmission channels based on their channel power gains, which is given by the eigenvalues $\lambda_i(k)$.

If "selective" channel inversion is performed, then only transmission channels whose received powers are at or above a particular threshold β relative to the total received power are selected for use for data transmission. Transmission channels whose received powers fall below this threshold are discarded and not used. For each selected transmission channel, the transmit power to be allocated to the channel is determined as described above, such that all selected transmission channels are received at approximately equal power levels. The threshold β may be selected to maximize spectral efficiency or based on some other criterion.

The selection of the transmission channels for use may be performed as follows. Initially, an average power gain $P_{avg}$ is computed for all available transmission channels and may be expressed as:

$$P_{avg} = \frac{1}{N_F N_S} \sum_{k=1}^{N_F} \sum_{i=1}^{N_S} \lambda_i(k). \qquad \text{Eq (12)}$$

The transmit power to allocate to each transmission channel may then be expressed as:

$$P_i(k) = \begin{cases} \dfrac{\tilde{\alpha} P_{total}}{\lambda_i(k)}, & \lambda_i(k) \geq \beta P_{avg} \\ 0, & \text{otherwise,} \end{cases} \quad \text{Eq (13)}$$

where β the threshold and $\tilde{\alpha}$ is a normalization factor that is similar to α in equation (11). However, the normalization factor $\tilde{\alpha}$ is computed over only the selected transmission channels and may be expressed as:

$$\tilde{\alpha} = \dfrac{1}{\sum_{\lambda_i(k) \geq \beta P_{avg}} \lambda_i(k)^{-1}}. \quad \text{Eq (14)}$$

The threshold β may be derived as described below (in Section 3.2).

As shown in equation (13), a transmission channel is selected for use if its eigenvalue (or channel power gain) is greater than or equal to a power threshold (i.e., $\lambda_i(k) \geq \beta P_{avg}$). Since the normalization factor $\tilde{\alpha}$ is computed based only on the selected transmission channels, the total transmit power $P_{total}$ is distributed to the selected transmission channels based on their channel gains such that all selected transmission channels have approximately equal received power, which may be expressed as $\tilde{\alpha} P_{total}$.

The equalization of the received SNRs for all selected transmission channels can thus be achieved by non-uniform distribution of the total transmit power across these channels. The approximately equal received SNRs would then allow the use of a single data rate and a common coding/modulation scheme for all selected transmission channels, which would greatly reduce complexity.

3. Selective Channel Inversion Applied Per Eigenmode

The "SCI-per-eigenmode" scheme performs selective channel inversion independently for each eigenmode to provide improved performance. In an embodiment, the $N_S N_F$ transmission channels are arranged into $N_S$ groups such that each group includes all $N_F$ frequency bins for a given eigenmode (i.e., group i includes the spatial subchannels for all $N_F$ frequency bins for eigenmode i). There is thus one group for each eigenmode.

The SCI-per-eigenmode scheme includes two steps. In the first step, the total transmit power $P_{total}$ is distributed to the $N_S$ groups based on a particular group power allocation scheme. In the second step, selective channel inversion is performed independently for each group to distribute that group's allocated transmit power to the $N_F$ frequency bins in the group. Each of these steps is described in further detail below.

3.1 Power Allocation Across Groups

The total transmit power $P_{total}$ may be distributed to the $N_S$ groups in various manners, some of which are described below.

In a first embodiment, the total transmit power $P_{total}$ is distributed uniformly across all $N_S$ groups such that they are all allocated equal power. The transmit power $P_G(i)$ allocated to each group may be expressed as:

$$P_G(i) = \dfrac{P_{total}}{N_S}, \text{ for } i \in \{1, \ldots, N_S\}. \quad \text{Eq (15)}$$

In a second embodiment, the total transmit power $P_{total}$ is distributed to the $N_S$ groups based on water-filling across all available transmission channels. For this embodiment, the total transmit power, $P_{total}$, is first distributed to all $N_S N_F$ transmission channels using water-filling, as described above. Each transmission channel is allocated $P_i(k)$, for $i \in qj\{1, \ldots, N_S\}$ and $k = \{1, \ldots, N_F\}$. The transmit power allocated to each group can then be determined by summing over the transmit powers allocated to the $N_F$ transmission channels in that group. The transmit power allocated to group i may be expressed as:

$$P_G(i) = \sum_{k=1}^{N_F} P_i(k), \text{ for } i \in \{1, \ldots, N_S\}. \quad \text{Eq (16)}$$

In a third embodiment, the total transmit power $P_{total}$ is distributed to the $N_S$ groups based on water-filling across all groups using their average channel SNRs. Initially, the average channel SNR, $\gamma_{avg}(i)$, for each group is determined as:

$$\gamma_{avg}(i) = \dfrac{1}{N_F} \sum_{k=1}^{N_F} \dfrac{\lambda_i(k)}{\sigma^2}, \text{ for } i \in \{1, \ldots, N_S\}. \quad \text{Eq (17)}$$

Water-filling is then performed to distribute the total transmit power $P_{total}$ across the $N_S$ groups based on their average channel SNRs. The transmit power allocated to each of the $N_S$ groups is denoted as $P_G(i)$, for $i \in \{1, \ldots, N_S\}$.

In a fourth embodiment, the total transmit power $P_{total}$ is distributed to the $N_S$ groups based on water-filling across all groups using the received SNRs of the transmission channels after channel inversion. For this embodiment, the total transmit power $P_{total}$ is first distributed uniformly to the $N_S$ groups as shown above in equation (15) such that each group is allocated an initial transmit power of $\tilde{P}_G(i) = P_{total}/N_S$, for $i \in \{1, \ldots, N_S\}$. Selective channel inversion is then performed independently on each group to determine an initial power allocation, $\tilde{P}_i(k)$ for $k = \{1, \ldots, N_F\}$, for each frequency bin in the group. The received SNR, $\tilde{\gamma}_i(k)$, for each frequency bin is next determined based on the initial power allocation $\tilde{P}_i(k)$, as shown in equation (8). The average received SNR $\tilde{\gamma}_{avg}(i)$ for each group is then computed as follows:

$$\tilde{\gamma}_{avg}(i) = \dfrac{1}{N_F} \sum_{k=1}^{N_F} \tilde{\gamma}_i(k), \text{ for } i \in \{1, \ldots, N_S\}. \quad \text{Eq (18)}$$

The total transmit power $P_{total}$ is then distributed to the $N_S$ groups using water-filling based on their average received SNRs, $\tilde{\gamma}_{avg}(i)$ for $i \in \{1, \ldots, N_S\}$. The results of the water-filling power allocation are revised (i.e., final) transmit power allocations $P_G(i)$, for $i \in \{1, \ldots, N_S\}$, for the $N_S$ groups. Selective channel inversion is again performed independently for each group to distribute the group's allocated transmit power $P_G(i)$ to the frequency bins in the group. Each frequency bin would then be allocated transmit power $P_i(k)$ by the second selective channel inversion.

The second selective channel inversion need not be performed for a given group if (1) the revised transmit power allocated to the group by the water-filling is greater than the initial uniform power allocation (i.e., $P_G(i) > \tilde{P}_G(i)$) and (2) all frequency bins in the group were selected for use in the initial selective channel inversion. For this specific case, the new power allocation $P_i(k)$ for each frequency bin in the group may be expressed as:

$$P_i(k) = \frac{P_G(i)}{\tilde{P}_G(i)} \tilde{P}_i(k), \text{ for } k \in \{1, \ldots, N_F\}. \quad \text{Eq (19)}$$

Equation (19) may be used because (1) all frequency bins in the group have already been selected for use and no additional frequency bin can be selected even though the revised power allocation $P_G(i)$ for the group is higher than the initial power allocation $\tilde{P}_G(i)$, and (2) the initial selective channel inversion already determines the proper distribution of power to the frequency bins in the group to achieve approximately equal received SNRs for these channels. In all other cases, the selective channel inversion is performed again for each group to determine the transmit power allocations, $P_i(k)$ for $k \in \{1, \ldots, N_F\}$, for the frequency bins in the group.

3.2 Selective Channel Inversion Applied to Each Group

Once the total transmit power $P_{total}$ has been distributed to the $N_S$ groups using any one of the group power allocation schemes described above, selective channel inversion is performed independently for each of the $N_S$ groups and on the $N_F$ frequency bins within each group. The selective channel inversion for each group may be performed as follows.

Initially, the average power gain, $P_{avg}(i)$, for each group is determined as:

$$P_{avg}(i) = \frac{1}{N_F} \sum_{k=1}^{N_F} \lambda_i(k), \text{ for } i \in \{1, \ldots, N_S\}. \quad \text{Eq (20)}$$

The transmit power allocated to frequency bin k in group i may then be expressed as:

$$P_i(k) = \begin{cases} \frac{\tilde{\alpha}_i P_{total}}{\lambda_i(k)}, & \lambda_i(k) \geq \beta_i P_{avg}(i) \\ 0, & \text{otherwise,} \end{cases} \quad \text{Eq (21)}$$

where $\beta_i$ is the threshold and $\tilde{\alpha}_i$ is the normalization factor for group i. The normalization factor $\tilde{\alpha}_i$ for each group is computed over only the selected transmission channels for that group, and may be expressed as:

$$\tilde{\alpha}_i = \frac{1}{\sum_{\lambda_i(k) \geq \beta_i P_{avg}(i)} \lambda_i(k)^{-1}}. \quad \text{Eq (22)}$$

The summation of the inverse channel power gains in equation (22) takes into account the channel power gains over all selected frequency bins of group i.

The threshold $\beta_i$ to select frequency bins for use in each group may be set based on various criteria, e.g., to optimize spectral efficiency. In one embodiment, the threshold $\beta_i$ is set based on the channel power gains (or eigenvalues) and the spectral efficiencies of the selected frequency bins based on uniform transmit power allocation across the frequency bins in each group, as described below.

For this embodiment, the derivation of the threshold $\beta_i$ for group i proceeds as follows (where the derivation is performed independently for each group). Initially, the eigenvalues for all $N_F$ frequency bins in the group are ranked and placed in a list $G_i(l)$, for $l \in \{1, \ldots, N_F\}$, in descending order such that $G_i(1) = \max\{\lambda_i(k)\}$ and $G_i(N_F) = \min\{\lambda_i(k)\}$ for $i \in \{1, \ldots, N_S\}$.

For each l, where $l \in \{1, \ldots, N_F\}$, the spectral efficiency for the l best frequency bins is computed, where "best" refers to the frequency bins with the highest power gains, $G_i(l)$. This can be achieved as follows. First, the total transmit power available to the group, $P_G(i)$, is distributed to the l best frequency bins using any one of the power allocation schemes described above. For simplicity, the uniform power allocation scheme is used, and the transmit power for each of the l frequency bins is $P_G(i)/l$. Next, the received SNR for each of the l frequency bins is computed as:

$$\gamma_i^l(j) = \frac{P_G(i) G_i(j)}{\sigma^2 l}, \text{ for } j \in \{1, \ldots, l\}. \quad \text{Eq (23)}$$

The spectral efficiency $C_i(l)$ for the l best frequency bins in group i is then computed as:

$$C_i(l) = \rho \sum_{j=1}^{l} \log_2(1 + \gamma_i^l(j)), \quad \text{Eq (24)}$$

where $\rho$ is a scale factor used to account for inefficiencies in the coding and modulation scheme selected for use.

The spectral efficiency $C_i(l)$ is computed for each value of l, where $l \in \{1, \ldots, N_F\}$, and stored in an array. After all $N_F$ values of $C_i(l)$ have been computed for the $N_F$ possible combinations of selected frequency bins, the array of spectral efficiencies is traversed and the largest value of $C_i(l)$ is determined. The value of l, $l_{max}$, corresponding to the largest $C_i(l)$ is then the number of frequency bins that results in the maximum spectral efficiency for the channel conditions being evaluated and using uniform transmit power allocation.

Since the eigenvalues for the $N_F$ frequency bins in group i are ranked in decreasing order in the list $G_i(l)$, the spectral efficiency increases as more frequency bins are selected for use until the optimal point is reached, after which the spectral efficiency decreases because more of the group's transmit power is allocated to poorer frequency bins. Thus, instead of computing the spectral efficiency $C_i(l)$ for all possible values of l, the spectral efficiency $C_i(l)$ for each new value of l may be compared against the spectral efficiency $C_i(l-1)$ for the previous value of l. The computation may then be terminated if the optimal spectral efficiency is reached, which is indicated by $C_i(l) < C_i(l-1)$.

The threshold $\beta_i$ may then be expressed as:

$$\beta_i = \frac{G_i(l_{max})}{P_{avg}(i)}, \quad \text{Eq (25)}$$

where $P_{avg}(i)$ is determined as shown in equation (20).

The threshold $\beta_i$ may also be set based on some other criterion or some other power allocation scheme (instead of uniform allocation).

Selective channel inversion is described in further detail in U.S. patent application Ser. No. 09/860,274, filed May 17, 2001, Ser. No. 09/881,610, filed Jun. 14, 2001, and Ser. No. 09/892,379, filed Jun. 26, 2001, all three entitled "Method and Apparatus for Processing Data for Transmission in a Multi-Channel Communication System Using Selective Channel Inversion," assigned to the assignee of the present application and incorporated herein by reference.

Performing selective channel inversion independently for each group results in a set of transmit power allocations, $P_i(k)$ for $k \in \{1, \ldots, N_F\}$, for the $N_F$ frequency bins in each group. The selective channel inversion may result in less than $N_F$ frequency bins being selected for use for any given group. The unselected frequency bins would be allocated no transmit power (i.e., $P_i(k)=0$ for these bins). The power allocations for the selected frequency bins are such that these bins achieve approximately equal received SNRs. This then allows a single data rate and a common coding/modulation scheme to be used for all selected frequency bins in each group.

For the sorted form, the eigenvalues $\lambda_i(k)$, for $i \in \{1, \ldots, N_S\}$, for each diagonal matrix $D(k)$ are sorted such that the diagonal elements with smaller indices are generally larger. Eigenmode 1 would then be associated with the largest eigenvalue in each of the $N_F$ diagonal matrices, eigenmode 2 would be associated with the second largest eigenvalue, and so on. For the sorted form, even though the channel inversion is performed over all $N_F$ frequency bins for each eigenmode, the eigenmodes with lower indices are not likely to have too many bad frequency bins (if any) and excessive transmit power is not used for bad bins.

If water-filling is used to distribute the total transmit power to the $N_S$ eigenmodes, then the number of eigenmodes selected for use may be reduced at low SNRs. The sorted form thus has the advantage that at low SNRs, the coding and modulation are further simplified through the reduction in the number of eigenmodes selected for use.

For the random-ordered form, the eigenvalues for each diagonal matrix $D(k)$ are randomly ordered. This may result in a smaller variation in the average received SNRs for all of the eigenmodes. In this case, fewer than $N_S$ common coding and modulation schemes may be used for the $N_S$ eigenmodes.

In one transmission scheme, if a group is to be used for data transmission, then all $N_F$ frequency bins in that group are selected (i.e., any active eigenmode needs to be a complete eigenmode). The frequency selective nature of an eigenmode can be exaggerated if one or more frequency bins are omitted from use. This greater frequency selective fading can cause higher level of inter-symbol interference (ISI), which is a phenomenon whereby each symbol in a received signal acts as distortion to subsequent symbols in the received signal. Equalization may then be required at the receiver to mitigate the deleterious effects of ISI distortion. This equalization may be avoided by performing full channel inversion on all frequency bins of each eigenmode that is selected for use. This transmission scheme may be advantageously used in conjunction with the sorted form and the water-filling power allocation since, as noted above, the eigenmodes with lower indices are not likely to have too many bad frequency bins.

Figure 2:
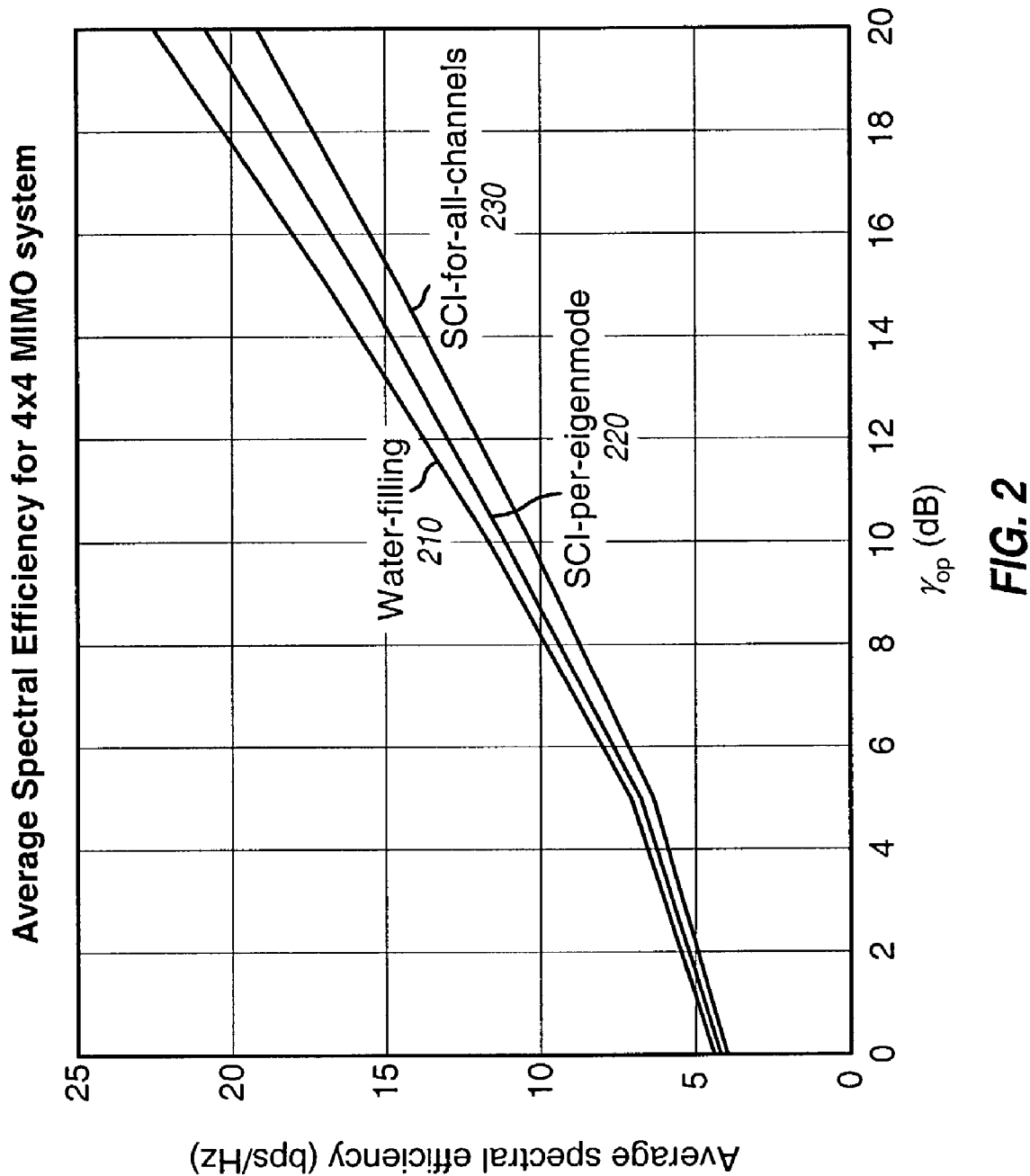
FIG. 2 shows plots of the average spectral efficiency achieved by three transmission schemes for an example 4×4 MIMO system.

FIG. 2 shows plots of the average spectral efficiency achieved by three transmission schemes for an example 4×4 MIMO system with total transmit power of $P_{total}=4$. Three plots are shown in FIG. 2 for three transmission schemes: (1) water-filling power allocation over all transmission channels, (2) selective channel inversion applied to all transmission channels (SCI-for-all-channels), and (3) selective channel inversion applied to each eigenmode independently (SCI-per-eigenmode) with the total transmit power being distributed among the four groups using water-filling based on their average channel SNRs.

The average spectral efficiency is plotted versus operating SNR, which is defined as $\gamma_{op}=1/\sigma^2$. FIG. 2 indicates that the water-filling power allocation (plot 210) yields the highest spectral efficiency, as expected. The performance of the SCI-for-all-channels scheme (plot 230 is approximately 2.5 dB worse than that of the optimal water-filling scheme at a spectral efficiency of 15 bps/Hz. However, the SCI-for-all-channels scheme results in much lower complexity for both the transmitter and receiver since a single data rate and a common coding/modulation scheme may be used for all selected transmission channels. The performance of the SCI-per-eigenmode scheme (plot 220) is approximately 1.5 dB worse than that of the water-filling scheme and 1.0 dB better than that of the SCI-for-all-channels scheme at 15 bps/Hz spectral efficiency. This result is expected since the SCI-per-eigenmode scheme combines water-filling with selective channel inversion. Although the SCI-per-eigenmode scheme is more complex than the SCI-for-all-channels scheme, it is less complex than the water-filling scheme and achieves comparable performance.

Figure 3:
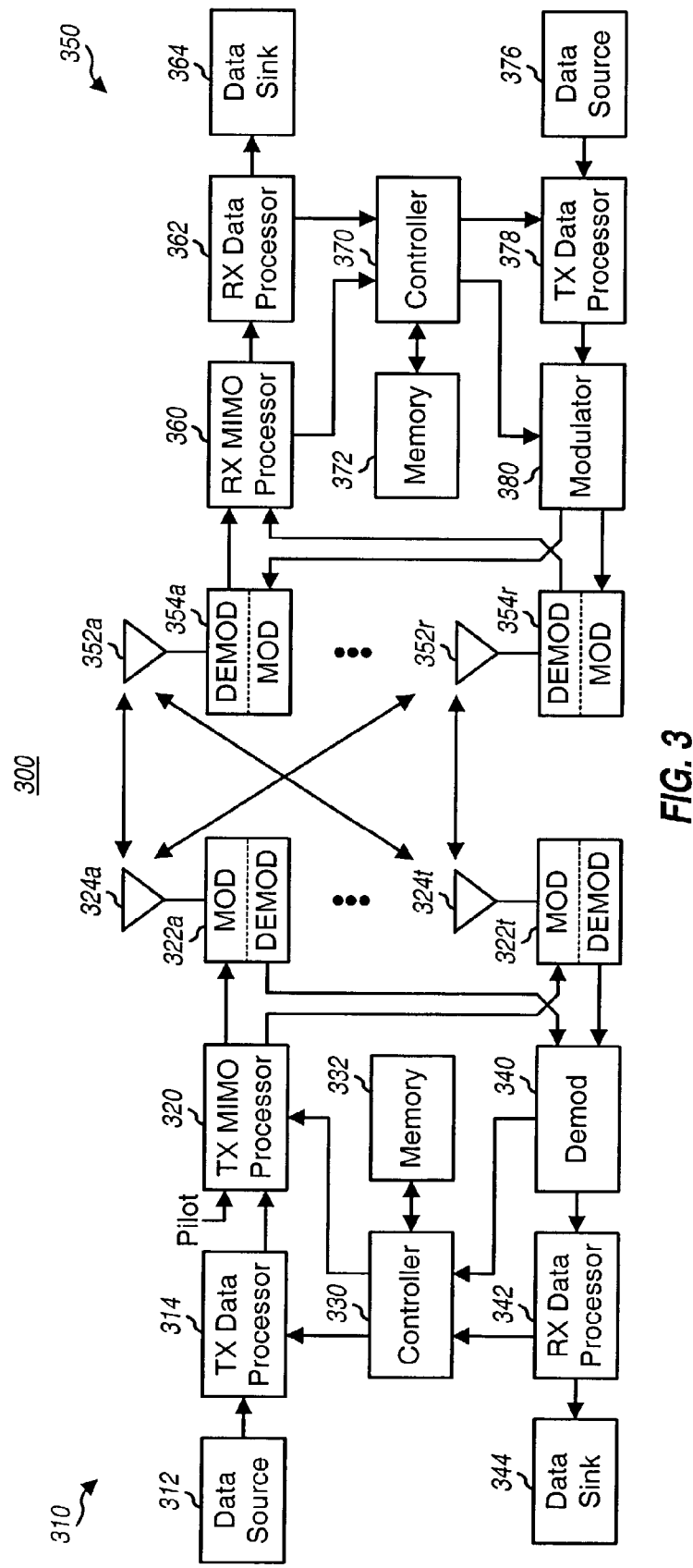
FIG. 3 is a block diagram of an access point and a user terminal in the MIMO-OFDM system.

FIG. 3 is a block diagram of an embodiment of an access point 310 and a user terminal 350 in a MIMO-OFDM system 300.

At access point 310, traffic data (i.e., information bits) from a data source 312 is provided to a transmit (TX) data processor 314, which codes, interleaves, and modulates the data to provide modulation symbols. A TX MIMO processor 320 further processes the modulation symbols to provide preconditioned symbols, which are then multiplexed with pilot data and provided to $N_T$ modulators (MOD) 322a through 322t, one for each transmit antenna. Each modulator 322 processes a respective stream of preconditioned symbols to generate a modulated signal, which is then transmitted via a respective antenna 324.

At user terminal 350, the modulated signals transmitted from the $N_T$ antennas 324a through 324t are received by $N_R$ antennas 352a through 352r. The received signal from each antenna 352 is provided to a respective demodulator (DEMOD) 354. Each demodulator 354 conditions (e.g., filters, amplifies, and frequency downconverts) and digitizes the received signal to provide a stream of samples, and further processes the samples to provide a stream of received symbols. An RX MIMO processor 360 then processes the $N_R$ received symbol streams to provide $N_T$ streams of recovered symbols, which are estimates of the modulation symbols sent by the access point.

The processing for the reverse path from the user terminal to the access point may be similar to, or different from, the processing for the forward path. The reverse path may be used to send channel state information (CSI) from the user terminal back to the access point. The CSI is used at the access point to select the proper coding and modulation schemes for use and to perform the selective channel inversion.

Controllers 330 and 370 direct the operation at the access point and user terminal, respectively. Memories 332 and 372 provide storage for program codes and data used by controllers 330 and 370, respectively.

Figure 4:
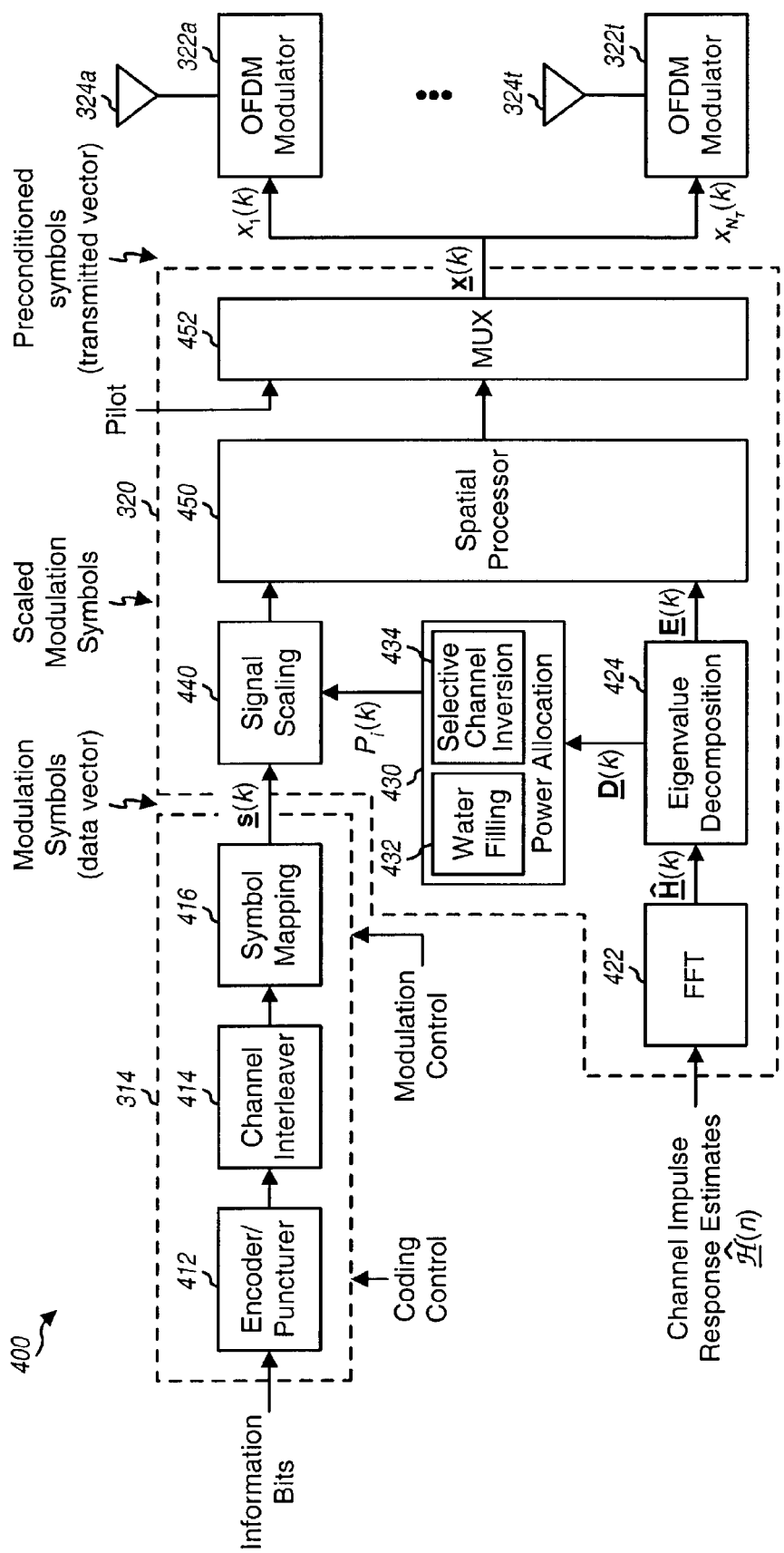
FIG. 4 is a block diagram of a transmitter unit in the access point.

FIG. 4 is a block diagram of an embodiment of a transmitter unit 400, which is an embodiment of the transmitter portion of access point 310 in FIG. 3. Transmitter unit 400 may also be used for user terminal 350.

Within TX data processor 314, an encoder/puncturer 412 receives and codes the traffic data (i.e., the information bits) in accordance with one or more coding schemes to provide coded bits. A channel interleaver 414 then interleaves the coded bits based on one or more interleaving schemes to provide a combination of time, spatial, and/or frequency diversity. A symbol mapping element 416 then maps the interleaved data in accordance with one or more modulation schemes (e.g., QPSK, M-PSK, M-QAM, and so on) to provide modulation symbols.

The coding and modulation for the $N_S$ groups may be performed in various manners. In one embodiment, a separate coding and modulation scheme is used for each group of transmission channels for which selective channel inversion is applied. For this embodiment, a separate set of encoder, interleaver, and symbol mapping element may be used for each group. In another embodiment, a common coding scheme is used for all groups, followed by a variable-rate puncturer and a separate modulation scheme for each group. This embodiment reduces hardware complexity at both the transmitter and the receiver. In other embodiments, trellis coding and Turbo coding may also be used to code the information bits.

Within TX MIMO processor 320, estimates of the impulse response of the MIMO channel are provided to a fast Fourier transform (FFT) unit 422 as a sequence of matrices of time-domain samples, $\hat{H}(n)$. FFT unit 422 then performs an FFT on each set of $N_F$ matrices $\hat{H}(n)$ to provide a corresponding set of $N_F$ estimated channel frequency response matrices, $\hat{H}(k)$ for $k \in \{1, \ldots, N_F\}$.

A unit 424 then performs eigenvalue decomposition on each matrix $\hat{H}(k)$ to provide the unitary matrix $E(k)$ and the diagonal matrix $D(k)$, as described above. The diagonal matrices $D(k)$ are provided to a power allocation unit 430 and the unitary matrices $E(k)$ are provided to a spatial processor 450.

Power allocation unit 430 distributes the total transmit power $P_{total}$ to the $N_S$ groups using any one of the group power allocation schemes described above. This results in power allocations of $P_G(i)$, for $i \in \{1, \ldots, N_S\}$, for the $N_S$ groups. Unit 430 then performs selective channel inversion independently for each group based on that group's allocated transmit power $P_G(i)$. This results in power allocations of $P_i(k)$, for $k \in \{1, \ldots, N_F\}$, for the $N_F$ frequency bins in each group, where $P_i(k)$ may be equal to zero for one or more bins in the group (if it is not required that any active eigenmode be complete eigenmode). Unit 432 performs water-filling to distribute the total transmit power, and unit 434 performs selective channel inversion for each group. The power allocations $P_i(k)$ for all transmission channels are provided to a signal scaling unit 440.

Unit 440 receives and scales the modulation symbols based on the power allocations to provide scaled modulation symbols. The signal scaling for each modulation symbol may be expressed as:

$$s_i'(k) = s_i(k)\sqrt{P_i(k)}, \text{ for } i \in \{1, \ldots, N_S\} \text{ and } k \in \{1, \ldots, N_F\}, \quad \text{Eq (26)}$$

where $s_i(k)$ is the modulation symbol to be transmitted on eigenmode i of frequency bin k, $s_i'(k)$ is the corresponding scaled modulation symbol, and $\sqrt{P_i(k)}$ is the scaling factor for this symbol to achieve the channel inversion.

A spatial processor 450 then preconditions the scaled modulation symbols based on the unitary matrices $E(k)$ to provide preconditioned symbols, as follows:

$$x(k) = E(k)\tilde{s}(k), \text{ for } k \in \{1, \ldots, N_F\}, \quad \text{Eq (27)}$$

where $\tilde{s}(k) = [s_1(k) \; s_2(k) \; \ldots \; s_{N_1}(k)]^T$, $x(k) = [x_1(k) \; x_2(k) \; \ldots \; x_{N_T}(k)]^T$, and $x_i(k)$ is the preconditioned symbol to be sent on frequency bin k of transmit antenna i. If $N_S < N_T$, then $\tilde{s}(k)$ would include $N_S$ none-zero entries and the remaining $N_T - N_S$ entries would be zero.

A multiplexer (MUX) 452 receives and multiplexes pilot data with the preconditioned symbols. The pilot data may be transmitted on all or a subset of the transmission channels, and is used at the receiver to estimate the MIMO channel. Multiplexer 452 provides one stream of preconditioned symbols to each OFDM modulator 322.

Within each OFDM modulator 322, an IFFT unit receives the preconditioned symbol stream and performs an inverse FFT on each set of $N_F$ symbols for the $N_F$ frequency bins to obtain a corresponding time-domain representation, which is referred to as an OFDM symbol. For each OFDM symbol, a cyclic prefix generator repeats a portion of the OFDM symbol to form a corresponding transmission symbol. The cyclic prefix ensures that the transmission symbol retains its orthogonal properties in the presence of multipath delay spread. A transmitter unit then converts the transmission symbols into one or more analog signals and further conditions (e.g., amplifies, filters, and frequency upconverts) the analog signals to generate a modulated signal that is then transmitted from the associated antenna 324.

Figure 5:
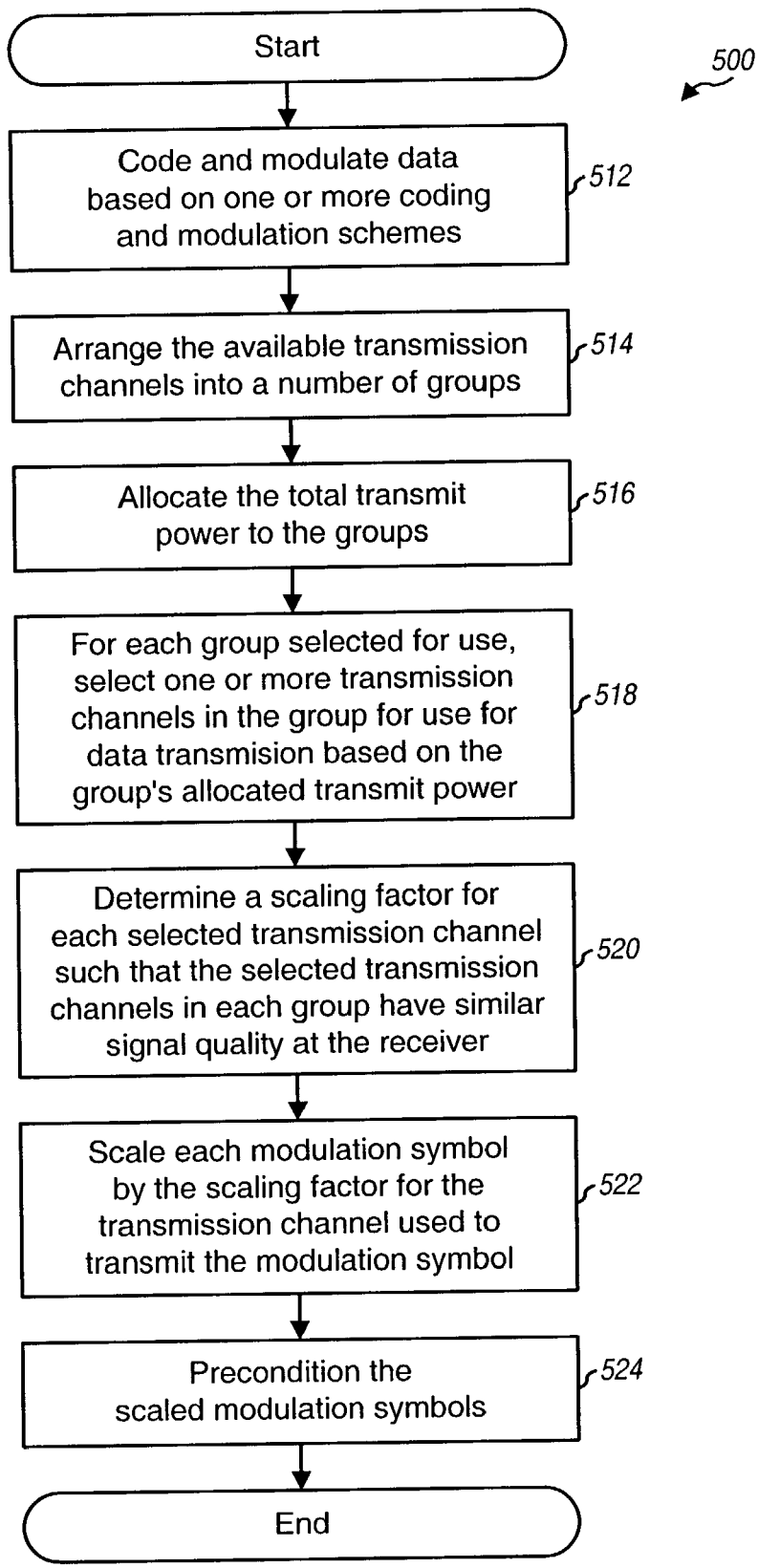
FIG. 5 is a flow diagram for processing data using selective channel inversion per eigenmode.

FIG. 5 is a flow diagram of an embodiment of a process 500 for processing data using selective channel inversion per eigenmode. Initially, data to be transmitted is coded and modulated based on one or more coding and modulation schemes (step 512).

The available transmission channels are arranged into a number of groups, where each group may include all frequency bins for a given eigenmode (step 514). (Each group may also be defined to include frequency bins for multiple eigenmodes, or only a subset of the frequency bins for a single eigenmode.) The total transmit power is then allocated to the groups using a particular group power allocation scheme (step 516).

Selective channel inversion is then performed independently for each group. For each group selected for use (i.e., with non-zero allocated transmit power), one or more frequency bins in the group is selected for use for data transmission based on the transmit power allocated to the group (step 518). Alternatively, all frequency bins in the group may be selected if the group is to be used. A scaling factor is then determined for each selected frequency bin such that all selected frequency bins for each group have similar received signal quality, which may be quantified by received SNR, received power, or some other measure (step 520).

Each modulation symbol is then scaled by the scaling factor for the frequency bin to be used to transmit that modulation symbol (step 522). The scaled modulation symbols may further be preconditioned to diagonalize the MIMO channel (step 524). The preconditioned symbols are further processed and transmitted.

For clarity, specific embodiments have been described above. Variations to these embodiments and other embodiments may also be derived based on the teachings described herein. For example, it is not necessary to use the SCI-per-eigenmode scheme with spatial processing (i.e., preconditioning) at the transmitter. Other techniques may also be used to diagonalize the MIMO channel without performing preconditioning at the transmitter. Some such techniques are described in U.S. patent application Ser. No. 09/993,087, entitled "Multiple-Access Multiple-Input Multiple-Output (MIMO) Communication System," filed Nov. 6, 2001, assigned to the assignee of the present application and incorporated herein by reference. If spatial processing is not performed at the transmitter, then the selective channel inversion may be applied per transmit antenna or some other group unit.

The selective channel inversion may be performed at the transmitter based on the estimated channel response matrix $\hat{H}(k)$, as described above. The selective channel inversion may also be performed at the receiver based on the channel gains, the received SNRs, or some other measure of received signal quality. In any case, the transmitter is provided with sufficient channel state information (CSI), in whatever form, such that it is able to determine (1) the particular data rate and coding and modulation scheme to use for each eigenmode and (2) the transmit power (or scaling factor) to use for each selected transmission channel such that the channels in each group have similar signal quality at the receiver (i.e., to invert the selected transmission channels).

The techniques described herein may also be used to perform selective channel inversion on groups that are defined to be something other than single eigenmode. For example, a group may be defined to include the frequency bins for multiple eigenmodes, or only some of the frequency bins for one or more eigenmodes, and so on.

For clarity, the techniques for performing selective channel inversion per eigenmode have been described specifically for a MIMO-OFDM system. These techniques may also be used for a MIMO system that does not employ OFDM. Moreover, although certain embodiments have been specifically described for the forward link, these techniques may also be applied for the reverse link.

The techniques described herein may be implemented by various means. For example, these techniques may be implemented in hardware, software, or a combination thereof. For a hardware implementation, the elements used to implement any one or a combination of the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory 332 or 372 in FIG. 3) and executed by a processor (e.g., controller 330 or 370). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for processing data for transmission in a multiple-input, multiple-output (MIMO) communication system, comprising:
   arranging a plurality of available transmission channels into a plurality of groups, each group comprising multiple transmission channels;
   allocating total transmit power to the plurality of groups; and
   for each group of transmission channels to be used for data transmission,
      determining a group threshold,
      selecting one or more of the multiple transmission channels in the group for use, wherein the selecting is based on the group threshold, and
      determining a scaling factor for each of the one or more selected transmission channels such that the one or more selected transmission channels in each group have similar received signal quality,
   wherein a first determined group threshold for a first group of transmission channels is different than a second determined group threshold for a second group of transmission channels.

2. The method of claim 1, wherein each group includes all transmission channels corresponding to a particular eigenmode of a MIMO channel.

3. The method of claim 1, wherein the total transmit power is uniformly allocated to the plurality of groups.

4. The method of claim 1, wherein the total transmit power is allocated to the plurality of groups based on water-filling.

5. The method of claim 4, wherein the water-filling is performed across the plurality of available transmission channels, and wherein the transmit power allocated to each group is based on transmit powers allocated to the multiple transmission channels in the group.

6. The method of claim 4, wherein the water-filling is performed based on average signal-to-noise-and-interference ratios (SNRs) for the plurality of groups.

7. The method of claim 4, wherein the water-filling is performed based on signal-to-noise-and-interference ratios (SNRs) for the plurality of available transmission channels after channel inversion.

8. The method of claim 1, further comprising:
   coding and modulating data based on one or more coding and modulation schemes to provide modulation symbols; and
   scaling each modulation symbol based on the scaling factor for the transmission channel used to transmit the modulation symbol.

9. The method of claim 8, wherein the data for each group of transmission channels is coded based on a separate coding scheme.

10. The method of claim 8, wherein the data for the plurality of groups of transmission channels is coded based on a common coding scheme, and wherein coded data for each group is punctured with a rate selected for the group.

11. The method of claim 8, further comprising:
   preconditioning scaled modulation symbols.

12. The method of claim 1, wherein the MIMO system implements orthogonal frequency division multiplexing (OFDM).

13. A method for processing data for transmission in a multiple-input, multiple-output (MIMO) communication system that implements orthogonal frequency division multiplexing (OFDM), comprising:
   arranging a plurality of available transmission channels into a plurality of groups, wherein each group includes multiple transmission channels corresponding to a particular eigenmode of a MIMO channel;
   allocating total transmit power to the plurality of groups; and
   for each group of transmission channels to be used for data transmission,
      determining a group threshold,
      selecting one or more of the multiple transmission channels in the group for use, wherein the selecting is based on the group threshold, and
      determining a scaling factor for each of the one or more selected transmission channels, such that the one or more selected transmission channels in each group have similar received signal quality, wherein a first determined group threshold for a first group of transmission channels is different than a second determined group threshold for a second group of transmission channels.

14. A transmitter unit in a multiple-input, multiple-output (MIMO) communication system, comprising:

a transmit data processor operative to code and modulate data based on one or more coding and modulation schemes to provide modulation symbols; and a transmit MIMO processor operative to select one or more of multiple transmission channels in each of a plurality of groups of transmission channels for use for data transmission, wherein the selecting is based on a group threshold selected for each group, to determine a scaling factor for each of the one or more selected transmission channels in each group such that the one or more selected transmission channels in the group have similar received signal quality, to scale each modulation symbol based on the scaling factor for the transmission channel used to transmit the modulation symbol, and to allocate total transmit power to the plurality of groups, wherein a first determined group threshold for a first group of transmission channels is different than a second determined group threshold for a second group of transmission channels.

15. The transmitter unit of claim 14, wherein the one or more scaling factors for the one or more selected transmission channels in each group is determined based in part on the transmit power allocated to the group.

16. An apparatus in a multiple-input, multiple-output (MIMO) communication system that implements orthogonal frequency division multiplexing (OFDM), comprising:

a transmit data processor operative to code and modulate data based on one or more coding and modulation schemes to provide modulation symbols; and a transmit MIMO processor operative to allocate total transmit power to a plurality of groups of transmission channels, wherein each group includes multiple transmission channels corresponding to a particular eigenmode of a MIMO channel, to select a group threshold for each group, to select one or more of the multiple transmission channels in each group for use for data transmission, wherein the selecting is based on the group threshold, to determine a scaling factor for each of the one or more selected transmission channels in each group such that the one or more selected transmission channels in the group have similar received signal quality, and to scale each modulation symbol based on the scaling factor for the transmission channel used to transmit the modulation symbol, wherein a first determined group threshold for a first group of transmission channels is different than a second determined group threshold for a second group of transmission channels.

17. The apparatus of claim 16, wherein the transmit MIMO processor is further operative to precondition scaled modulation symbols.

18. An apparatus in a multiple-input, multiple-output (MIMO) communication system, comprising:

means for arranging a plurality of available transmission channels into a plurality of groups, each group comprising multiple transmission channels;

means for selecting a group threshold for each group;

means for selecting one or more of the multiple transmission channels in each group for use for data transmission, wherein the selecting is based on the group threshold;

means for allocating total transmit power to the plurality of groups; and means for determining a scaling factor for each of the one or more selected transmission channels in each group such that the one or more selected transmission channels in the group have similar received signal quality, wherein a first determined group threshold for a first group of transmission channels is different than a second determined group threshold for a second group of transmission channels.

19. The apparatus of claim 18, further comprising:

means for coding and modulating data based on one or more coding and modulation schemes to provide modulation symbols; and means for scaling each modulation symbol based on the scaling factor for the transmission channel used to transmit the modulation symbol.

20. The apparatus of claim 16, wherein each group includes all transmission channels corresponding to a particular eigenmode of a MIMO channel.

21. The apparatus of claim 16, wherein the transmit MIMO processor is configured to uniformly allocate the total transmit power to the plurality of groups.

22. The apparatus of claim 16, wherein the transmit MIMO processor is configured to allocate the total transmit power to the plurality of groups utilizing a water-filling technique.

23. The apparatus of claim 22, wherein the transmit MIMO processor is configured to utilize average signal-to-noise-and-interference ratios (SNRs) for the plurality of groups for water-filling.

24. The apparatus of claim 22, wherein the transmit MIMO processor is configured to utilize signal-to-noise-and-interference ratios (SNRs) for the plurality of available transmission channels after channel inversion for water-filling.

25. The apparatus of claim 16, wherein the transmit data processor is configured to code and modulate data for each group of transmission channels based on a separate coding scheme.

26. The apparatus of claim 16, wherein the transmit data processor is configured to code and modulate data for the plurality of groups of transmission channels based on a common coding scheme, and to puncture coded data for each group with a rate selected for the group.

27. The apparatus of claim 18, wherein each group includes all transmission channels corresponding to a particular eigenmode of a MIMO channel.

28. The apparatus of claim 18, wherein the means for allocating comprises means for uniformly allocating the total transmit power to the plurality of groups.

29. The apparatus of claim 18, wherein the means for allocating comprises means for allocating the total transmit power to the plurality of groups utilizing a water-filling technique.

30. The apparatus of claim 29, wherein the means for allocating comprises means for utilizing average signal-to-noise-and-interference ratios (SNRs) for the plurality of groups for water-filling.

31. The apparatus of claim 29, wherein the means for allocating comprises means for utilizing signal-to-noise-and-interference ratios (SNRs) for the plurality of available transmission channels after channel inversion for water-filling.

32. The apparatus of claim 19, wherein the means for coding and modulating comprises means for coding and modulating data for each group of transmission channels based on a separate coding scheme.

33. The apparatus of claim 19, wherein the means for coding and modulating comprises:
   means for coding and modulating data for the plurality of groups of transmission channels based on a common coding scheme, and
   means for puncturing coded data for each group with a rate selected for the group.

34. A non-transitory machine-readable storing executable instructions, the instructions comprising:
   code for arranging a plurality of available transmission channels into a plurality of groups, wherein each group includes multiple transmission channels corresponding to a particular eigenmode of a MIMO channel;
   code for allocating total transmit power to the plurality of groups; and
   for each group of transmission channels to be used for data transmission,
      code for determining a group threshold;
      code for selecting one or more of the multiple transmission channels in the group for use, wherein the selecting is based on the group threshold, and
      code for determining a scaling factor for each of the one or more selected transmission channels, such that the one or more selected transmission channels in each group have similar received signal quality,
   wherein a first determined group threshold for a first group of transmission channels is different than a second determined group threshold for a second group of transmission channels.

35. The machine-readable medium of claim 34, wherein each group includes all transmission channels corresponding to a particular eigenmode of a MIMO channel.

36. The machine-readable medium of claim 34, wherein said code for allocating further comprises code for uniformly allocating the total transmit power to the plurality of groups.

37. The machine-readable medium of claim 34, wherein said code for allocating further comprises code for allocating the total transmit power to the plurality of groups based on water-filling.

38. The non-transitory machine-readable medium storing executable instructions of claim 34, the instructions further comprising:
   code for coding and modulating data based on one or more coding and modulation schemes to provide modulation symbols; and
   code for scaling each modulation symbol based on the scaling factor for the transmission channel used to transmit the modulation symbol.

39. The method of claim 1, wherein determining a threshold comprises:
   arranging the multiple transmission channels in the group in a list having a descending order based on an eigenvalue of each transmission channel;
   computing a spectral efficiency when using the first n transmission channels in the list, where n is an integer having an initial value greater than or equal to 1 that is increased incrementally; and
   determining the threshold based at least in part on when the computed spectral efficiency of using the first n+1 transmission channels is lower than using the first n transmission channels.

* * * * *